(12) United States Patent
Kurematsu et al.

(10) Patent No.: US 6,281,867 B2
(45) Date of Patent: *Aug. 28, 2001

(54) DISPLAY PANEL AND PROJECTION TYPE DISPLAY APPARATUS

(75) Inventors: Katsumi Kurematsu, Hiratsuka; Osamu Koyama, Hachioji, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,833

(22) Filed: Mar. 9, 1998

(30) Foreign Application Priority Data

Mar. 10, 1997 (JP) .................................................. 9-072646

(51) Int. Cl.$^7$ ..................................................... G09G 3/36
(52) U.S. Cl. .......................... 345/88; 345/151; 345/152; 349/8; 349/95
(58) Field of Search ........................... 345/88, 151, 152; 349/5, 8, 95

(56) References Cited

U.S. PATENT DOCUMENTS

| | | | |
|---|---|---|---|
| 4,099,841 | * | 7/1978 | Ellis ........................................ 350/173 |
| 5,056,912 | * | 10/1991 | Hamada et al. ........................ 353/38 |
| 5,341,153 | * | 8/1994 | Benzschawel et al. .............. 345/152 |
| 5,715,022 | * | 2/1998 | Takamatsu et al. ................. 348/759 |
| 5,777,794 | * | 7/1998 | Nakaoka ............................... 359/632 |
| 5,825,443 | | 10/1998 | Kawasaki et al. . |
| 5,844,644 | * | 12/1998 | Oh et al. ............................... 349/95 |

FOREIGN PATENT DOCUMENTS

| | | |
|---|---|---|
| 0 303 852 A1 | 2/1989 | (EP) . |
| 0 708 568 A1 | 4/1996 | (EP) . |
| WO 95/20811 | 8/1995 | (WO) . |

OTHER PUBLICATIONS

English Abstract (Patent Abstracts of Japan) Corresponding to JP 9–230321.

* cited by examiner

*Primary Examiner*—Richard Hjerpe
*Assistant Examiner*—Kimnhung Nguyen
(74) *Attorney, Agent, or Firm*—Morgan & Finnegan LLP

(57) ABSTRACT

A display panel is characterized by a pixel unit array comprising pixel units having a combination of two of, first, second and third three color pixels disposed in a first direction and a combination of two color pixels differing from the combination of the two color pixels disposed in a second direction differing from the first direction, so as to share a color pixel, the pixel units being two-dimensionally arranged at a predetermined pitch on a substrate, and a microlens array comprising a plurality of microlenses in which the pitch of the two color pixels in the first direction and the second direction is one pitch, the plurality of microlenses being two-dimensionally arranged on the pixel unit array on the substrate.

15 Claims, 27 Drawing Sheets

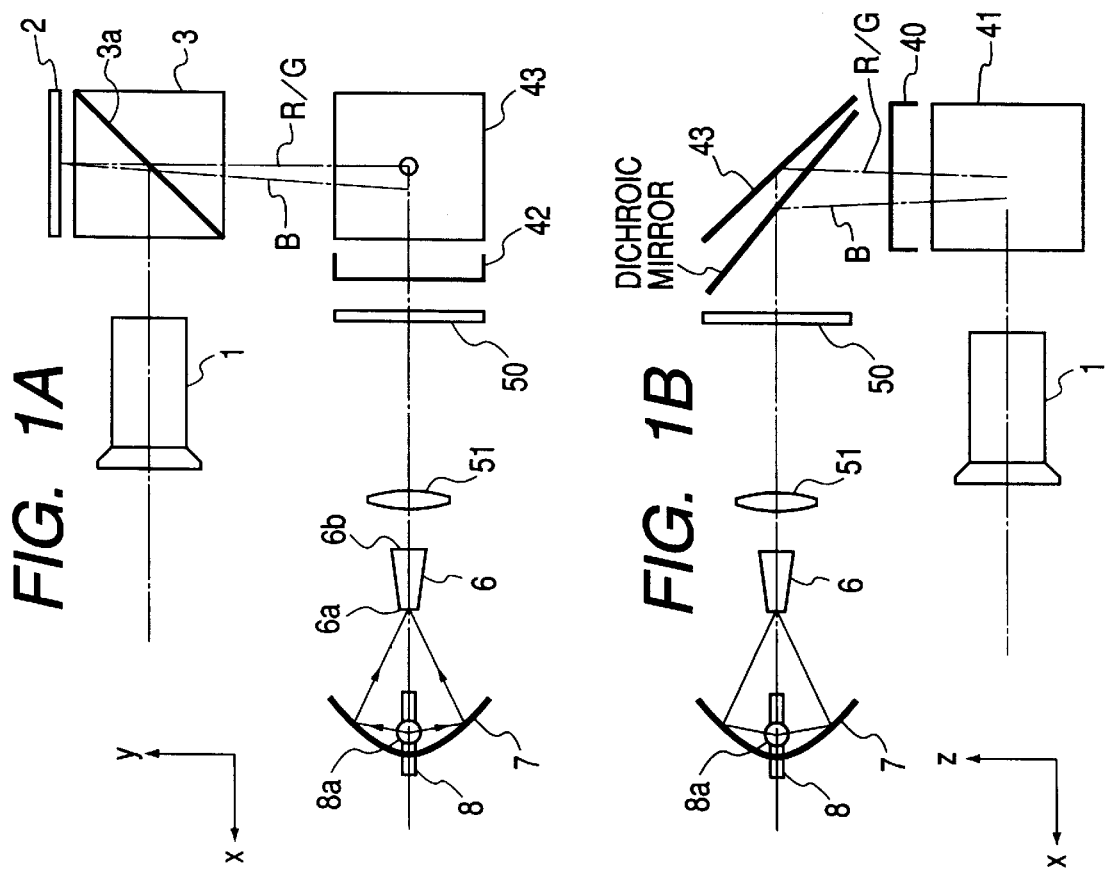

FIG. 2A 42. B-REFLECTION DICHROIC MIRROR SPECTRAL CHARACTERISTIC
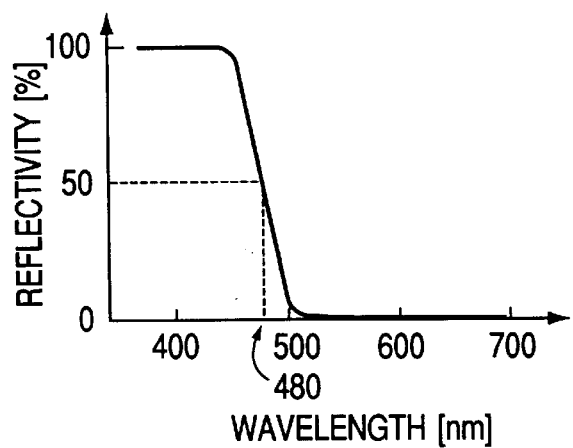
FIG. 2B 41. B/G-REFLECTION DICHROIC MIRROR SPECTRAL CHARACTERISTIC
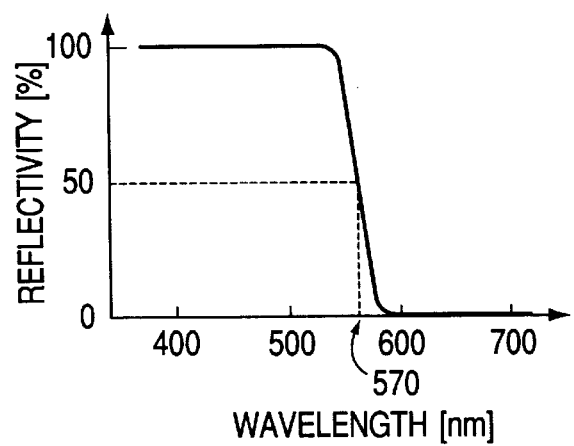
FIG. 2C 40. R-REFLECTION DICHROIC MIRROR SPECTRAL CHARACTERISTIC
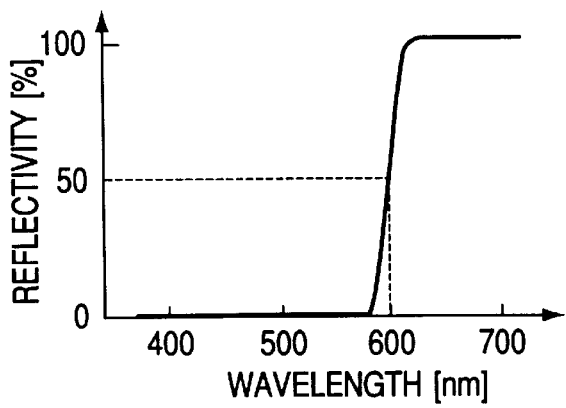

ORANGE COLOR

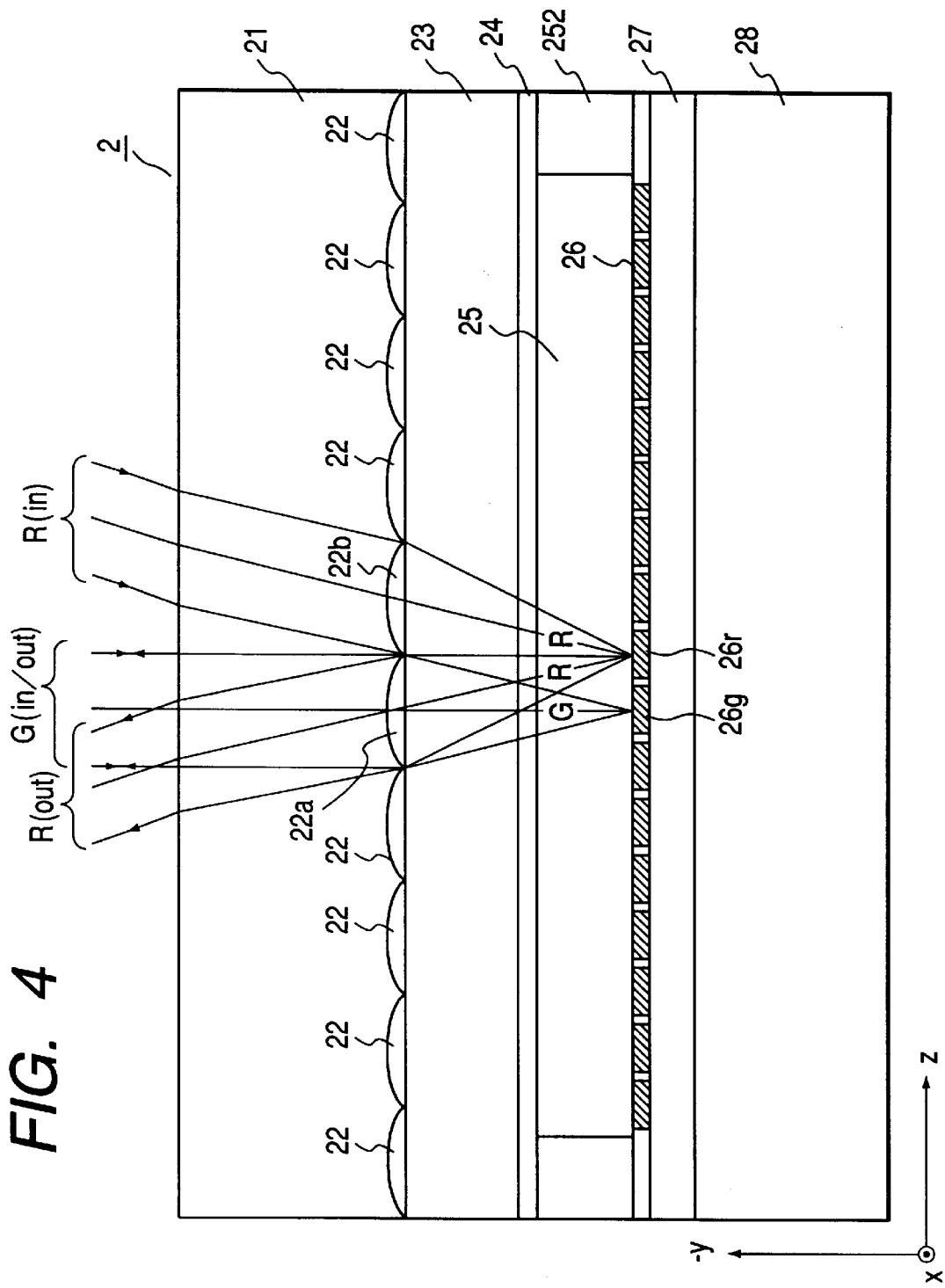

R, G, B-ALREADY-MIXED-OPTIONAL COLOR

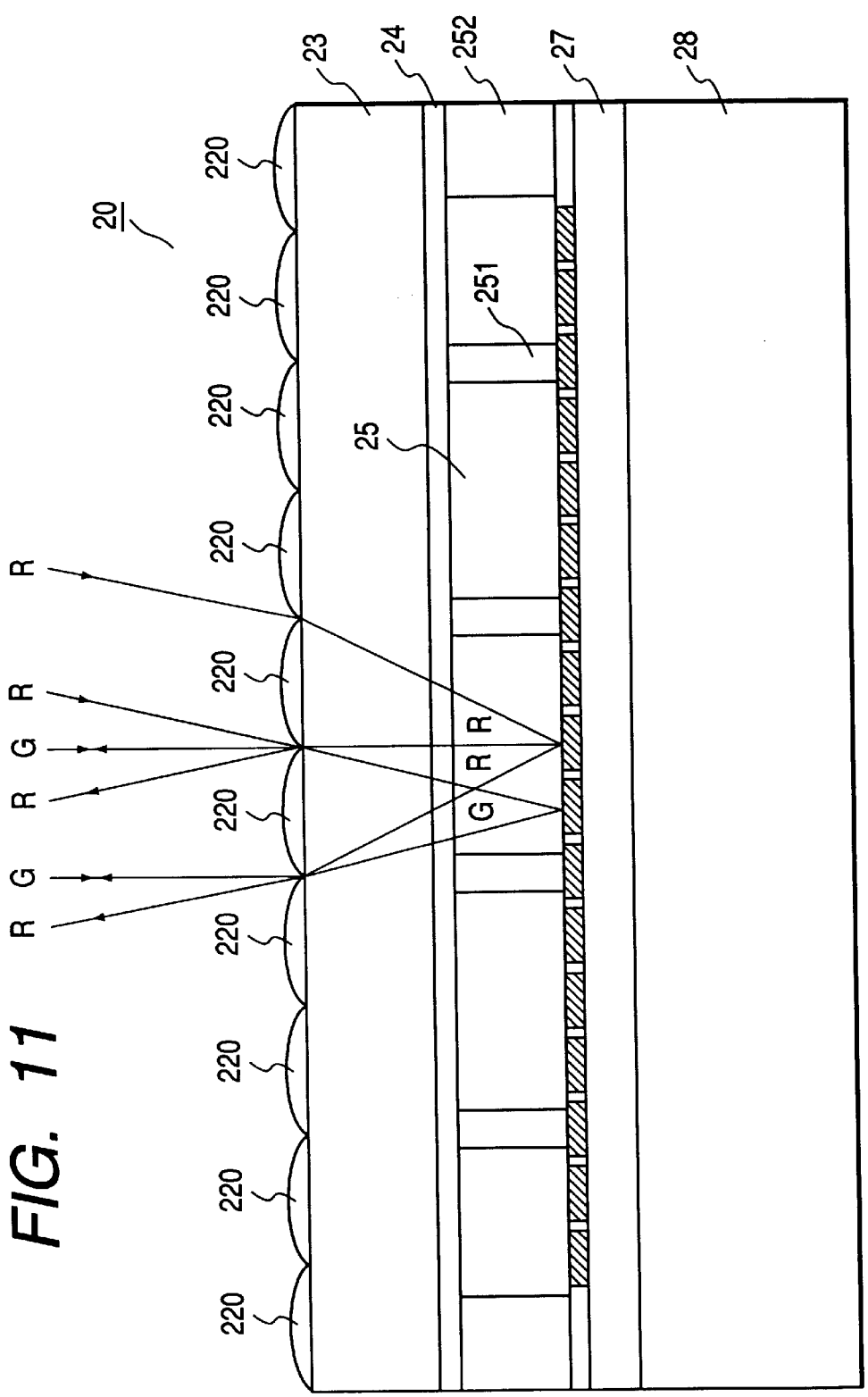

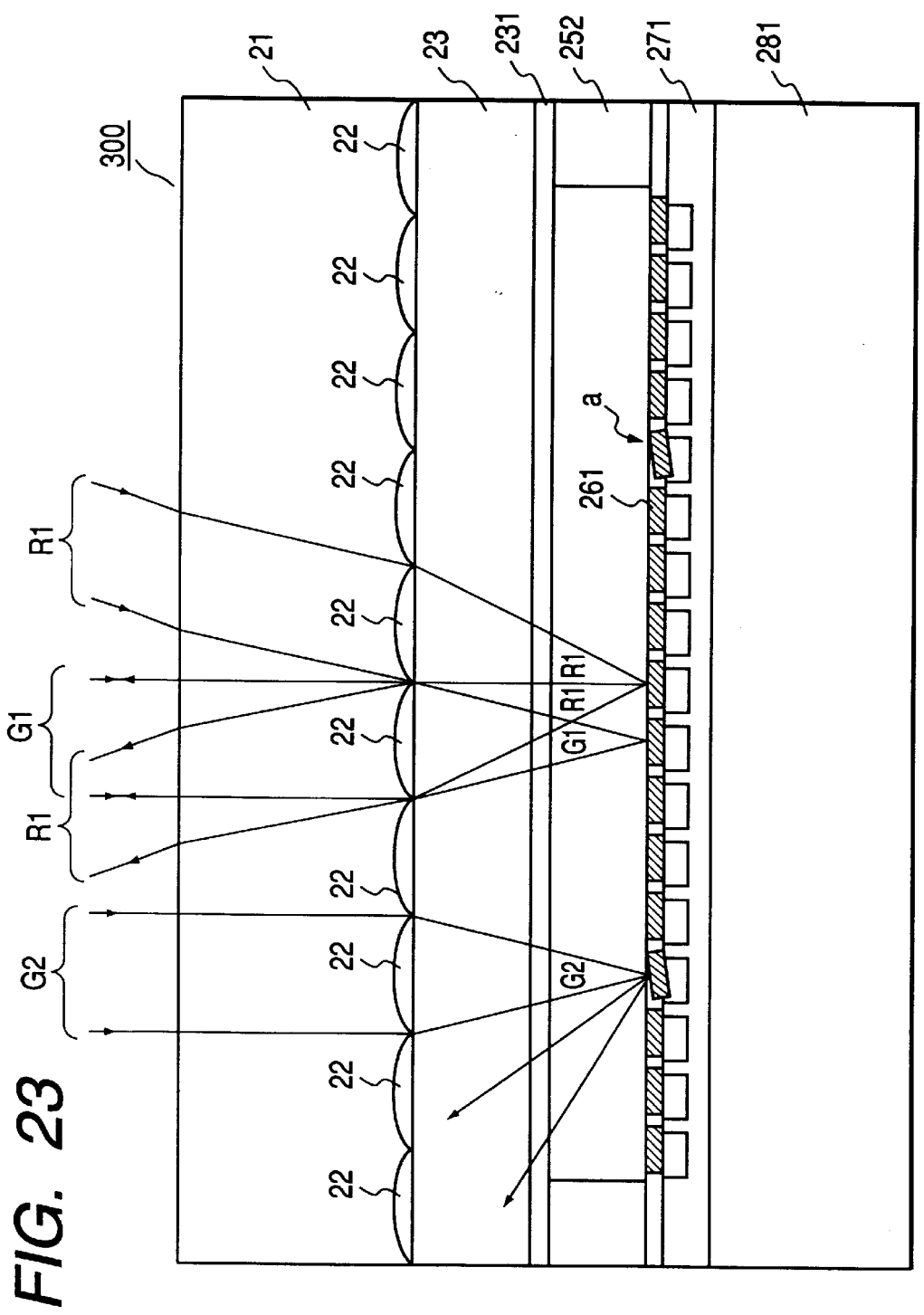

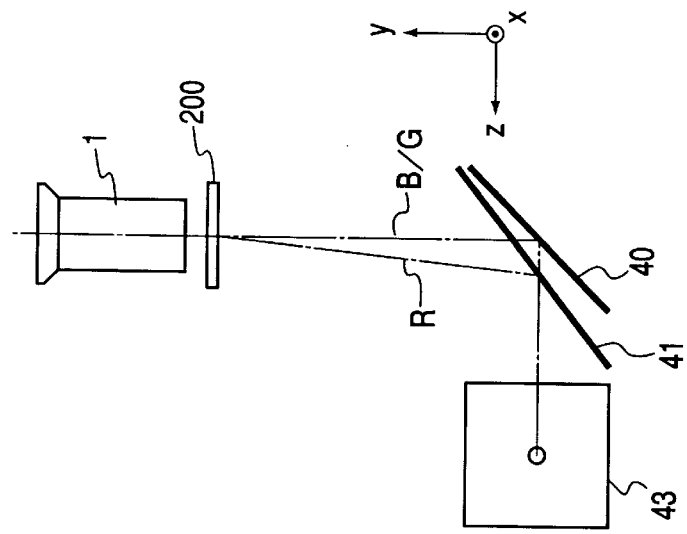
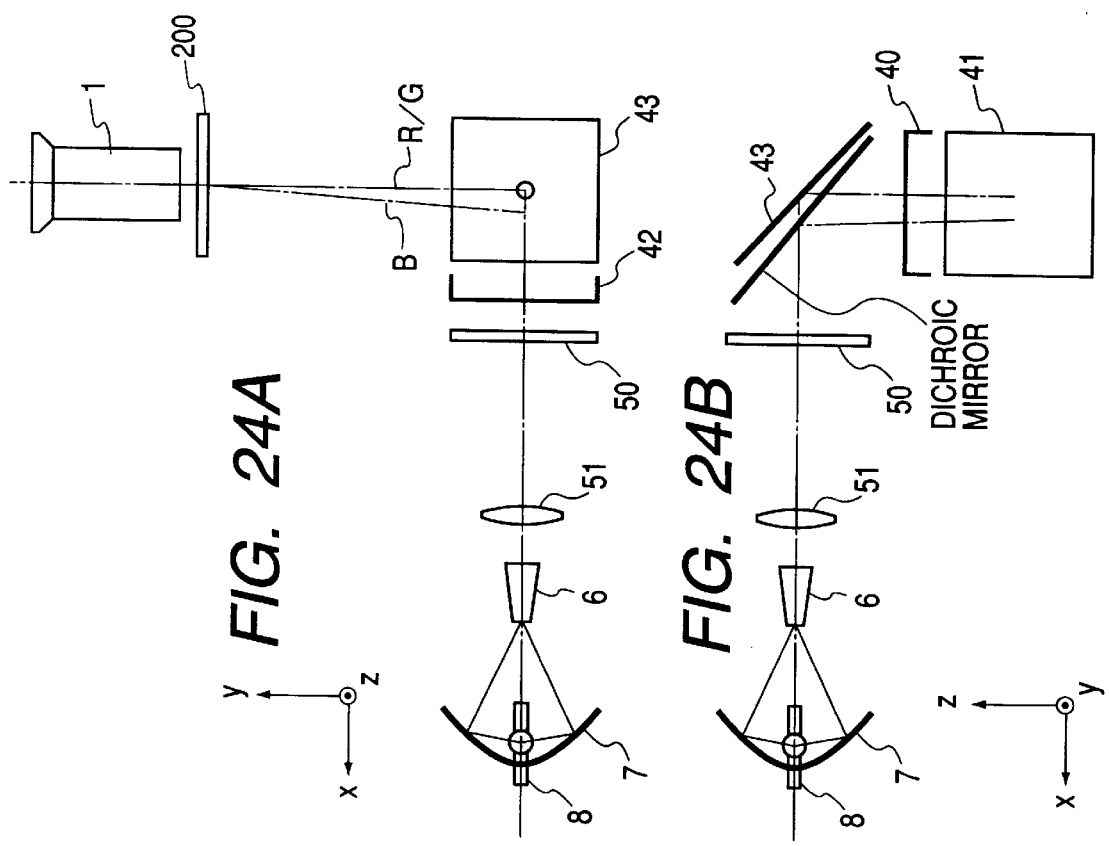

DISPLAY PANEL AND PROJECTION TYPE DISPLAY APPARATUS

BACKGROUND OF THE INVENTION

1. Field of the Invention

This invention relates to a display panel and a projection type display apparatus, and is suitable, for example, for a full color display apparatus of the single plate type for effecting the display of a full color image by the use of a display panel with a microlens array like a microlens array provided on the light incidence surface of a liquid crystal display element.

2. Related Background Art

There have heretofore been proposed various projection type display apparatuses using a display panel with a microlens array of this kind. For example, Japanese Laid-Open Patent Application No. 8-114780 proposes a transmission type liquid crystal display element as a display panel with a microlens array.

FIG. 13 of the accompanying drawings is a cross-sectional view of the essential portions of a liquid crystal display element LP proposed in the abovementioned publication. In FIG. 13, the reference numeral 16 designates a microlens array comprising a plurality of microlenses 16a arranged at a predetermined pitch, the reference numeral 17 denotes a liquid crystal layer, and the reference numeral 18 designates R (red), G (green) and B (blue) pixels.

This element LP is designed such that when red, green and blue illuminating lights R, G and B are applied to the element LP from different angles, the respective color lights enter only corresponding color pixels 18 by the condensing action of the microlenses 16a. By this design, color filters can be eliminated in principle and accordingly, there is provided a display panel which is high in light utilization efficiency.

However, in such a conventional projection type display apparatus, R, G and B color pixels 18 are enlargedly projected onto a screen and therefore, as shown in FIG. 14 of the accompanying drawings, the mosaic structure of the R, G and B pixels becomes conspicuous on the screen, and this has led to the disadvantage that the quality of a displayed image is reduced.

SUMMARY OF THE INVENTION

The present invention has as its object the provision of a display panel and a projection type display apparatus capable of displaying an image of high quality.

The display panel of the present invention is characterized by:

(1-1) a pixel unit array comprising pixel units having a combination of two of, first, second and third three color pixels disposed in a first direction and a combination of two color pixels differing from the combination of the two color pixels disposed in a second direction differing from the first direction, so as to share a color pixel, the pixel units being two-dimensionally arranged at a predetermined pitch on a substrate, and a microlens array comprising a plurality of microlenses in which the pitch of the two color pixels in the first direction and the second direction is one pitch, the plurality of microlenses being two-dimensionally arranged on the pixel unit array on the substrate.

The display panel of the present invention is characterized by:

(1-2) a pixel unit array comprising pixel units having a combination of first and second color pixels of, first, second and third three color pixels disposed in a first direction and a combination of the first and third color pixels disposed in a second direction differing from the first direction, so as to share the first color pixel, the pixel units being two-dimensionally arranged at a predetermined pitch on a substrate, and a microlens array comprising a plurality of microlenses in which the pitch of the two color pixels in the first direction and the second direction is one pitch, the plurality of microlenses being two-dimensionally arranged on the pixel unit array on the substrate.

Particularly, in the construction (1-1) or (1-2), the display panel of the present invention is characterized in that:

(1-2-1) the first color pixel is located at a position corresponding to the central portion of the microlenses, the second color pixel is located at a position corresponding to the boundary portion between the microlenses of the microlens array in the first direction, and the third color pixel is located at a position corresponding to the boundary portion between the microlenses of the microlens array in the second direction;

(1-2-2) the three color pixels comprise reflection electrodes and are comprised of liquid crystal of a reflection display mode;

(1-2-3) the three color pixels comprise reflection electrodes and use the DMD operation of the reflection electrodes; and (1-2-4) the three color pixels utilize liquid crystal, and two microlens arrays in the same state of arrangement are provided at positions symmetrical with respect to a liquid crystal layer so as to sandwich the liquid crystal layer therebetween.

The projection type display apparatus of the present invention is characterized by:

(2-1) a display panel having a pixel unit array comprising pixel units having a combination of first and second color pixels of, first, second and third three color pixels disposed in a first direction and a combination of the first and third color pixels disposed in a second direction differing from the first direction, so as to share the first color pixel, the pixel units being two-dimensionally arranged at a predetermined pitch on a substrate, and a microlens array comprising a plurality of microlenses in which the pitch of the two color pixels in the first direction and the second direction is one pitch, the plurality of microlenses being two-dimensionally arranged on the pixel unit array on the substrate, the first color pixel being located at a position corresponding to the central portion of the microlenses, illuminating means for causing a first color light to enter the display panel perpendicularly thereto, causing a second color light to enter the display panel while being inclined in the first direction, and causing a third color light to enter the display panel while being inclined in the second direction, and projecting means for projecting a light beam light-modulated by the display panel onto a predetermined surface.

Particularly, the projection type display apparatus of the present invention is characterized in that (2-1-1) light beams from the three color pixels constituting the pixel units pass through the same microlens and enter the projecting means.

The projection type display apparatus of the present invention is characterized by:

(2-2) a display panel having a pixel unit array comprising pixel units having a combination of first and second color pixels of, first, second and third three color pixels disposed in a first direction and a combination of the first and third color pixels disposed in a second direction differing from the first direction, so as to share the first color pixel, the pixel units being two-dimensionally arranged at a predetermined pitch on a substrate, and a microlens array comprising a plurality of microlenses in which the pitch of the two color pixels in the first direction and the second direction is one pitch, the plurality of microlenses being two-dimensionally arranged on the pixel unit array on the substrate, the first color pixel being located at a position corresponding to the central portion of the microlenses, illuminating means for causing a first color light to enter the display panel perpendicularly thereto, causing a second color light to enter the display panel while being inclined in the first direction, and causing a third color light to enter the display panel while being inclined in the second direction, and projecting means for projecting a light beam light-modulated by the display panel onto a predetermined surface, the reflected lights from the three color pixels constituting the pixel units light-modulated by the display panel passing through the same microlens and being directed to the projecting means.

Particularly, in the construction (2-1) or (2-2), the projection type display apparatus of the present invention is characterized in that (2-2-1) the illuminating means color-resolves white light from a light source into a plurality of color lights by the use of a plurality of dichroic mirrors so that by the disposition of the plurality of dichroic mirrors, the plurality of color lights may be applied to the three color pixels from different directions for the respective color lights; and (2-2-2) the projecting means projects the disposition surface of the microlenses or the vicinity thereof onto a predetermined surface.

The direct-view type display apparatus of the present invention is characterized by:

(3-1) a display panel having a pixel unit array comprising pixel units having a combination of first and second color pixels of, first, second and third three color pixels disposed in a first direction and a combination of the first and third color pixels disposed in a second direction differing from the first direction, so as to share the first color pixel, the pixel units being two-dimensionally arranged at a predetermined pitch on a substrate, and a microlens array comprising a plurality of microlenses in which the pitch of the two color pixels in the first direction and the second direction is one pitch, the plurality of microlenses being two-dimensionally arranged on the pixel unit array on the substrate, the first color pixel being located at a position corresponding to the central portion of the microlenses, illuminating means for causing a first color light to enter the display panel perpendicularly thereto, causing a second color light to enter the display panel while being inclined in the first direction, and causing a third color light to enter the display panel while being inclined in the second direction, and an eyepiece for directing a light beam light-modulated by the display panel to an observer's eyeball so that image information based on the light beam may be observed.

The display apparatus of the present invention is characterized by:

(4-1) a display panel having a pixel unit array comprising pixel units having a combination of first and second color pixels of, first, second and third three color pixels disposed in a first direction and a combination of the first and third color pixels disposed in a second direction differing from the first direction, so as to share the first color pixel, the pixel units being two-dimensionally arranged at a predetermined pitch on a substrate, and a microlens array comprising a plurality of microlenses in which the pitch of the two color pixels in the first direction and the second direction is one pitch, the plurality of microlenses being two-dimensionally arranged on the pixel unit array on the substrate, the first color pixel being located at a position corresponding to the central portion of the microlenses, and illuminating means for causing a first color light to enter the display panel perpendicularly thereto, causing a second color light to enter the display panel while being inclined in the first direction, and causing a third color light to enter the display panel while being inclined in the second direction.

The display apparatus of the present invention is characterized by:

(4-2) a display panel having a pixel unit array comprising pixel units having a combination of first and second color pixels of, first, second and third three color pixels disposed in a first direction and a combination of the first and third color pixels disposed in a second direction differing from the first direction, so as to share the first color pixel, the pixel units being two-dimensionally arranged at a predetermined pitch on a substrate, and a microlens array comprising a plurality of microlenses in which the pitch of the two color pixels in the first direction and the second direction is one pitch, the plurality of microlenses being two-dimensionally arranged on the pixel unit array on the substrate, the first color pixel being located at a position corresponding to the central portion of the microlenses, and illuminating means for causing a first color light to enter the display panel perpendicularly thereto, causing a second color light to enter the display panel while being inclined in the first direction, and causing a third color light to enter the display panel while being inclined in the second direction, the emergent lights from the three color pixels constituting the pixel units light-modulated by the display panel being designed to pass through the same microlens.

BRIEF DESCRIPTION OF THE DRAWINGS

FIGS. 1A, 1B and 1C are schematic views of the essential portions of Embodiment 1 of the projection type display apparatus of the present invention.

FIGS. 2A, 2B and 2C are graphs showing the spectral reflection characteristics of dichroic mirrors used in the projection type display apparatus of the present invention.

FIG. 4 is a cross-sectional view showing Embodiment 1 of the liquid crystal panel of the present invention.

FIG. 11 is a fragmentary enlarged cross-sectional view showing Embodiment 2 of the liquid crystal panel of the present invention.

FIG. 23 is a fragmentary enlarged cross-sectional view of a display panel using a DMD device with microlenses according to Embodiment 5 of the present invention.

FIGS. 24A, 24B and 24C show the general construction of Embodiment 6 of the projection type display apparatus using the transmission type liquid crystal panel of the present invention.

DESCRIPTION OF THE PREFERRED EMBODIMENTS

Figure 3:
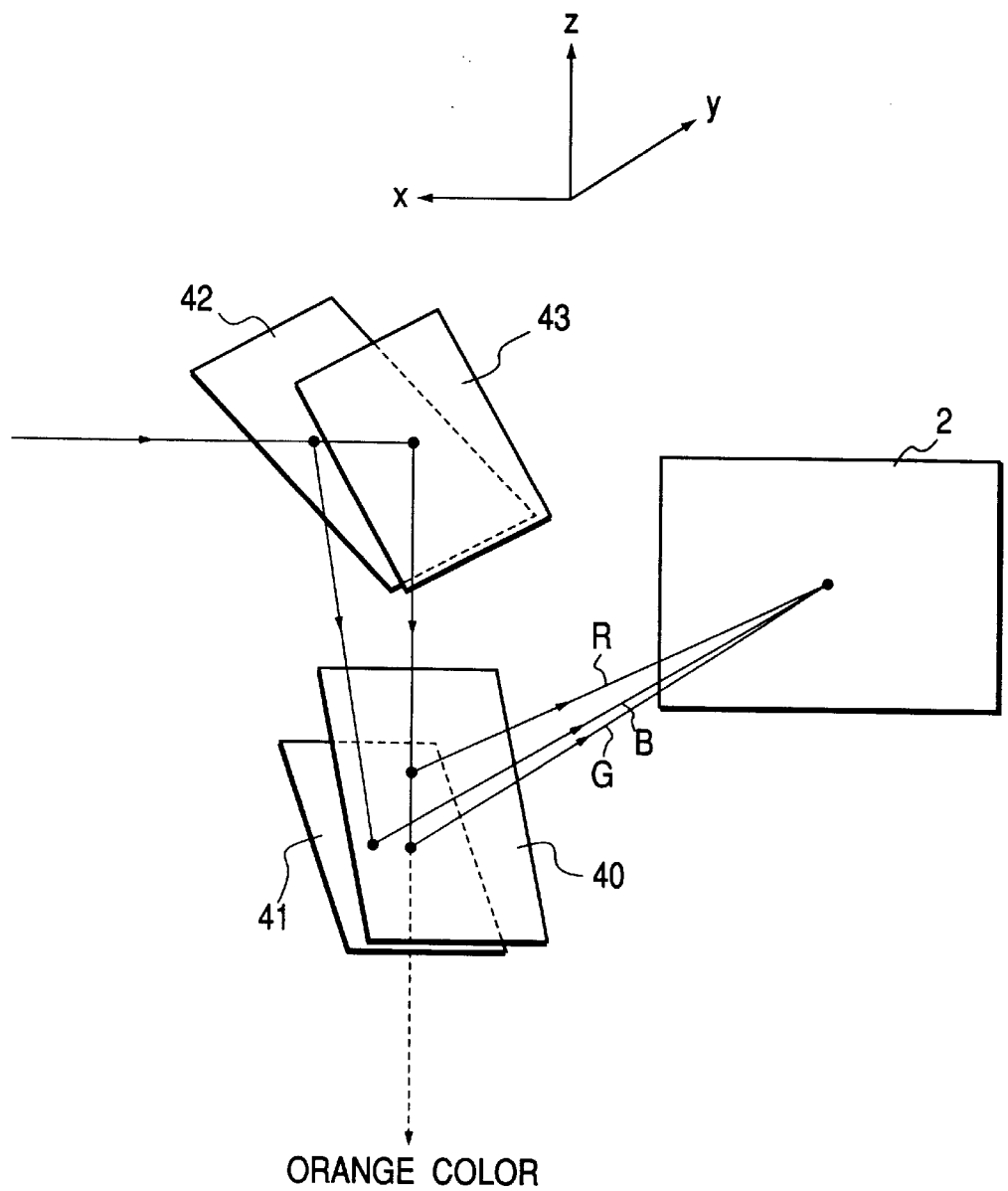
FIG. 3 is a perspective view of the color resolving and illuminating portion of the projection type display apparatus of the present invention.

FIGS. 1A, 1B and 1C are schematic views of the essential portions of the optical system of Embodiment 1 of the display panel and projection type liquid crystal display apparatus of the present invention. FIG. 1A is a top plan view of this optical system, FIG. 1B is a front view of this optical system, and FIG. 1C is a side view of this optical system.

In FIGS. 1A to 1C, the reference numeral 1 designates a projection lens which projects full color image (information) displayed by a liquid crystal display panel (liquid crystal panel) 2 with a microlens array onto a screen or a wall. The reference numeral 3 denotes a polarizing beam splitter (PBS). The PBS 3 transmits P-polarized light therethrough and reflects S-polarized light. The reference numeral 40 designates a dichroic mirror which reflects only red light (R), the reference numeral 41 denotes a dichroic mirror which reflects only blue and green lights (B and G), the reference numeral 42 designates a dichroic mirror which reflects only blue light (B), the reference numeral 43 denotes a high reflection mirror which reflects all color lights R, G and B, the reference numeral 50 designates a Fresnel lens, the reference numeral 51 denotes a convex lens (positive lens), the reference numeral 6 designates a rod type (inner surface reflection type) integrator, and the reference numeral 7 denotes an elliptical reflector, at the center of which there is disposed the light emitting portion of a light source 8 comprising an arc lamp such as a metal halide lamp or a UHP lamp.

The R reflecting dichroic mirror 40, the B/G reflecting dichroic mirror 41 and the B reflecting dichroic mirror 42 have spectral reflection characteristics as shown in FIGS. 2A, 2B and 2C, respectively. These dichroic mirrors 40, 41 and 42, with the high reflection mirror 43, are three-dimensionally disposed as shown in the perspective view of FIG. 3, and the mirrors 40, 41, 42 and 43, as will be described later, are designed to color-resolve the white light from the light source 8 into three R, G and B color lights and such that the R, G and B primary color lights illuminate the liquid crystal panel 2 from three-dimensionally different directions relative to the liquid crystal panel 2.

Describing here in accordance with the travelling process of the light beam from the light source 8, a white light beam emitted from the lamp 8 is first reflected by the elliptical reflector 7 and is condensed on the entrance (light incidence surface) 6a of the integrator 6 forward of the reflector 7, and as it travels through this integrator 6 while repeating reflection on the inner surface thereof, the spatial light intensity distribution thereof (of the white light beam) is uninformized. The light beam emerging from the exit (light emergence surface) of the integrator 6 is made into a parallel light beam in the x-axis-direction (reference) by the convex lens 51 and the Fresnel lens 50, and first comes to the B reflecting dichroic mirror 42.

Only B (blue light) is reflected by this B reflecting dichroic mirror 42 and travels toward the R reflecting dichroic mirror 40 in the z-axis-direction, i.e., downwardly (reference in FIG. 1B) at a predetermined angle with respect to the z-axis. On the other hand, the other color lights (R/G)

than B pass through this B reflecting dichroic mirror 42, whereafter they are reflected at a right angle in the z-axis-direction (downwardly) by the high reflection mirror 43, and travel toward the R reflecting dichroic mirror 40.

Explaining here on the basis of FIG. 1A, both of the B reflecting dichroic mirror 42 and the high reflection mirror 43 are disposed so as to reflect the x-axis-direction light beam from the integrator 6 in the z-axis-direction (downwardly), and the high reflection mirror 43 is inclined at just 45° with respect to xy plane with the y-axis direction as a rotational axis. In contrast, the B reflecting dichroic mirror 42 is set to an angle smaller than 45° with respect to xy plane with the y-axis direction as a rotational axis.

Accordingly, R/G reflected by the high reflection mirror 43 are reflected in the z-axis-direction, whereas B reflected by the B reflecting dichroic mirror 42 travels downwardly at a predetermined angle (inclined in xz plane) with respect to the z-axis. In order to make the illumination ranges of the three B and R/G primary color lights on the liquid crystal panel 2 coincident with one another, the amounts of shift and the amounts of tilt of the high reflection mirror 43 and the B reflecting dichroic mirror 42 are set so that the principal rays (central rays) of the respective color lights may intersect with one another on the liquid crystal panel 2.

Next, the three R, G and B primary color lights travelling downwardly (in the z-axis-direction) as previous described travel toward the R reflecting dichroic mirror 40 and the B/G reflecting dichroic mirror 41, but these are located under the B reflecting dichroic mirror 42 and the high reflection mirror 43, and the B/G reflecting dichroic mirror 41 is inclined at 45° with respect to xz plane with the x-axis as a rotational axis, and the R reflecting dichroic mirror 40 is set to an angle smaller than 45° with respect to xz plane with the x-axis direction as a rotational axis.

Accordingly, of R, G and B incident on these, B/G pass through the R reflecting dichroic mirror 40 and are reflected at a right angle in the y-axis +direction by the B/G reflecting dichroic mirror 41, and P-polarized lights alone are taken out by the PBS 3. These blue and green P-polarized lights illuminate the liquid crystal panel 2 horizontally disposed in xz plane.

The blue light B has already travelled at a predetermined angle (inclined in xz plane) with respect to the x-axis as previously described (see FIGS. 1A and 1B) and therefore, after it is reflected by the B/G reflecting dichroic mirror 41, it maintains a predetermined angle (inclined in xy plane) with respect to the y-axis, and P-polarized light alone is taken out by the PBS 3. This blue P-polarized light illuminates the liquid crystal panel 2 with the angle with respect to the y-axis as an angle of incidence (the direction of xy plane). The green light G is reflected at a right angle by the B/G reflecting dichroic mirror 41 and travels in the y-axis +direction, and P-polarized light alone is taken out by the PBS 3. This green P-polarized light illuminates the liquid crystal panel 2 at an angle of incidence of 0°, i.e., from a perpendicular direction.

Also, the red light R is reflected in the y-axis +direction by the R reflecting dichroic mirror 40 disposed short of the B/G reflecting dichroic mirror 41, as previously described, and travels in the y-axis +direction at a predetermined angle (inclined in yz plane) with respect to the y-axis as shown in FIG. 1C (a side view), and P-polarized light is taken out by the PBS 3. This red P-polarized light illuminates the liquid crystal panel 2 with this angle with respect to the y-axis as an angle of incidence (the direction of yz plane).

Also, in order to make the illumination ranges of the R, G and B color lights on the liquid crystal panel 2 coincident with one another, the amounts of shift and the amounts of tilt of the B/G reflecting dichroic mirror 41 and the R reflecting dichroic mirror 40 are set so that the principal rays of the respective color lights may intersect with one another on the liquid crystal panel 2.

Further, as shown in FIGS. 2A to 2C, the cut wavelength of the B/G reflecting dichroic mirror 41 is 570 nm and the cut wavelength of the R reflecting dichroic mirror 40 is 600 nm and therefore, unnecessary orange-colored light is transmitted through the B/G reflecting dichroic mirror 41 and is discarded out of the optical path. Thereby, optimum color balance is obtained.

Also, as will be described later, the three R, G and B primary color lights are reflected and polarized by the liquid crystal panel 2, and thereafter return to the PBS 3, and S-polarized lights alone are reflected in the x-axis +direction by the PBS surface 3a of the PBS 3. These S-polarized lights of the respective colors enter the projection lens 1, which thus enlarges and projects an image displayed on the liquid crystal panel 2 by these S-polarized lights of the respective colors onto a screen or a wall.

The R, G and B color lights illuminating the liquid crystal panel 2 differ in the angle of incidence onto the panel from one another and therefore, the R, G and B lights which are the lights reflected from the panel also differ in the angle of emergence from one another and thus, as the projection lens 1, use is made of one having a lens diameter and aperture of sufficient size to introduce these reflected lights of the respective colors. However, the expanse of the whole of the light beam from the panel 2 which enters the projection lens 1 maintains the expanse of the whole of the light beam when it has entered the liquid crystal panel 2, by each color light passing twice through the microlens.

Figures 13, 14:
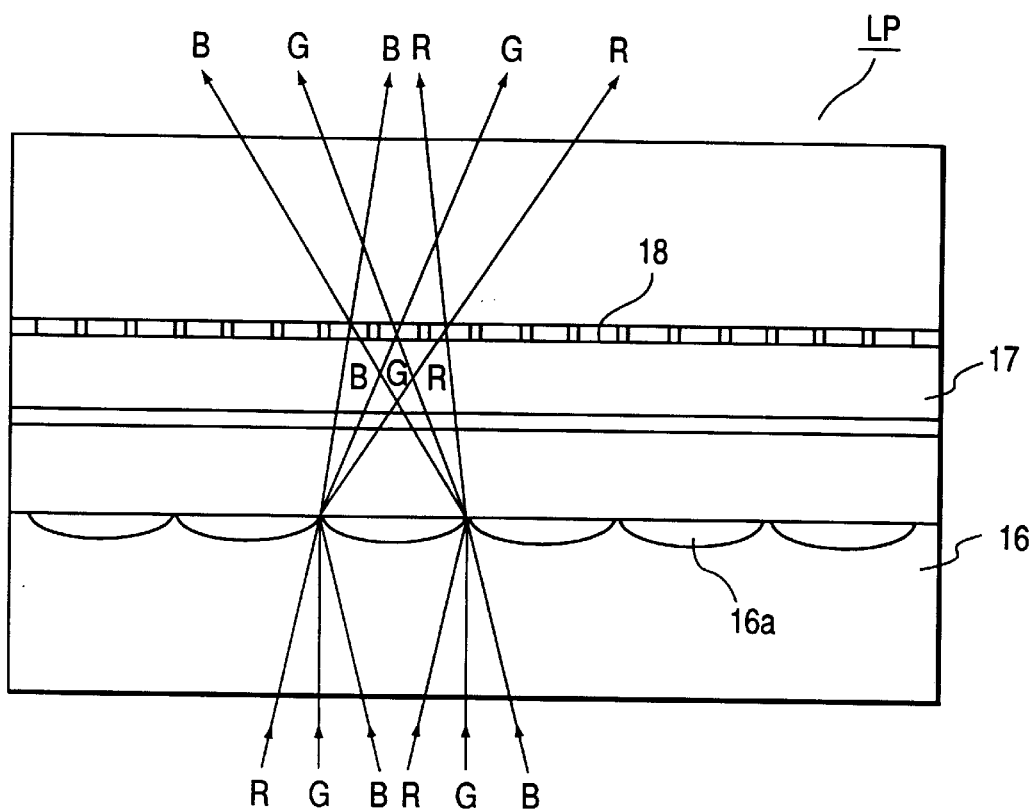
FIG. 13 is an enlarged cross-sectional view of a portion of a transmission type liquid crystal display element with a microlens array according to the prior art.
FIG. 14 is a fragmentary enlarged view of an image enlargedly projected onto a screen in a projection type display apparatus according to the prior art.

However, in the transmission type liquid crystal display element LP according to the prior art shown in FIG. 13, the whole of a light beam emerging from the liquid crystal display element LP expands more greatly with the aid of also the condensing action of the microlens 16 and therefore, in order to take in this greatly expanded light beam, a very great numerical aperture has been required of the projection lens, and this has led to a bulky projection lens.

In contrast, the expanse of the light beam from the liquid crystal panel 2 in the present embodiment is small as compared with that in the prior art of FIG. 13 and therefore, even a projection lens of a numerical aperture smaller than that in the prior art can enlarge and project a sufficiently bright image onto a wall or a screen and thus, it becomes possible to use a more compact projection lens.

The liquid crystal panel 2 will now be described in detail. FIG. 4 is a typical enlarged cross-sectional view (corresponding to the yz plane of FIG. 1C) of the liquid crystal panel 2 according to the present embodiment.

The reference numeral 21 designates a microlens array substrate (glass substrate), the reference characters 22, 22a and 22b denote microlenses, the reference numeral 23 designates sheet glass, the reference numeral 24 denotes a transparent opposed electrode, the reference numeral 25 designates a liquid crystal layer, the reference numeral 26 denotes pixel electrodes, the reference numeral 27 designates an active matrix driving circuit portion, and the reference numeral 28 denotes a semiconductor substrate formed of silicon. A number of microlenses 22 are formed on the surface of the glass substrate (glass of the alkaline origin) 21 by the so-called ion exchange method, and have fly-eye lenses two-dimensionally arranged in xz plane at a pitch twice as great as the pitch of the pixel electrodes 26, and form a so-called microlens array.

The liquid crystal layer 25 adopts nematic liquid crystal of ECB mode such as so-called DAP or HAN suited for the reflection type, and has its predetermined orientation maintained by an orientation layer, not shown, in a state in which an electric field is not applied. The pixel electrodes 26 serving also as a reflecting mirror are formed of Al (aluminum), and are subjected to the so-called CMP processing at the final step after pattering to make the surface property thereof good and improve the reflectance thereof (the details of this will be described later).

The active matrix driving circuit portion 27 is a semiconductor circuit provided on the silicon semiconductor substrate 28, and serves to active-matrix-drive the pixel electrodes 26. A gate line driver (a vertical register or the like) and a signal line driver (a horizontal register or the like), not shown, are provided around the circuit portion 27 (the details of this will be described later).

These surrounding drivers and the active matrix driving circuit portion 27 are designed to write R, G and B primary color image signals into predetermined R, G and B pixels, and each pixel electrode 26 does not have a color filter, but the pixel electrodes 26 are distinguished as R, G and B pixels by the primary color image signals written in by the active matrix driving circuit 27, and form a predetermined R, G and B pixel arrangement which will be described later.

Description will first be made here of the green light G of the illuminating lights to the liquid crystal panel 2. As previously described, the green light G is made into P-polarized light by the PBS 3, whereafter it enters the liquid crystal panel 2 perpendicularly thereto. An example of the light beam of this light G which enters a microlens 22a is indicated by arrows G (in/out) in FIG. 4.

As shown in FIG. 4, the light beam G is condensed by the microlens 22a and illuminates a G pixel electrode 26g. It is reflected by the pixel electrode 26g formed of aluminum, and again emerges out of the liquid crystal panel 2 through the same microlens 22a. When it thus reciprocally passes through the liquid crystal layer 25, the light beam G is subjected to polarization modulation by the liquid crystal having had its oriented state changed by an electric field formed between it and the opposed electrode 24 by a signal voltage applied to the pixel electrode 26g, and emerges from the liquid crystal panel 2 in a form including S-polarized light and returns to the PBS 3. Here, the quantity of image light (S-polarized light) reflected by the surface 3a of the PBS depending on the degree of modulation thereof and travelling toward the projection lens 1 changes and thus, the so-called gradation harmony display of the G pixel is done.

On the other hand, the R light obliquely entering the panel 4 in the cross-section (yz plane) in FIG. 4 as described above is also made into P-polarized light by the PBS 3, whereafter the light beam R entering, for example, the microlens 22b is condensed by the microlens 22b, as indicated by arrows R (in) in FIG. 4, and illuminates an R pixel electrode 26r lying at a position shifted to the left from just beneath it. It is then reflected by this pixel electrode 26r formed of aluminum, and as shown, now emerges out of the liquid crystal panel 2 through a microlens 22a neighboring in −z direction (R (out)).

In this case, the light beam G is subjected to polarization modulation by the liquid crystal having had its oriented state changed by an electric field formed between it and the opposed electrode 24 by a signal voltage also applied to the R pixel electrode 26r, and emerges from the liquid crystal panel 2 in a form including S-polarized light and returns to the PBS 3. The process thereafter is entirely the same as in the case of the aforedescribed light beam G, and the gradation harmony display of the R pixel is done.

Now, in FIG. 4, the color lights G and R on the G pixel electrode 26g and on the R pixel electrode 26r are depicted as partly overlapping and interfering with each other, but this is because typically the thickness of the liquid crystal layer 25 is exaggerated by depicted, and actually the thickness of the liquid crystal layer 25 is the order of $5\mu$ at greatest, and this thickness is very small as compared with the thickness of 50 to $100\mu$ of the sheet glass and therefore, such interference does not occur independently of the pixel size.

Figure 5A:
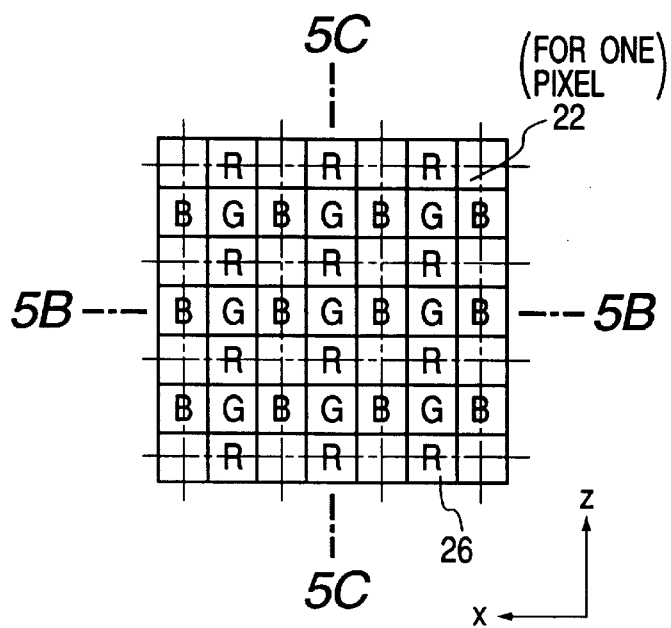
FIGS. 5A, 5B and 5C illustrate the principle of color resolution and color combination in the liquid crystal panel of the present invention.
Figure 5C:
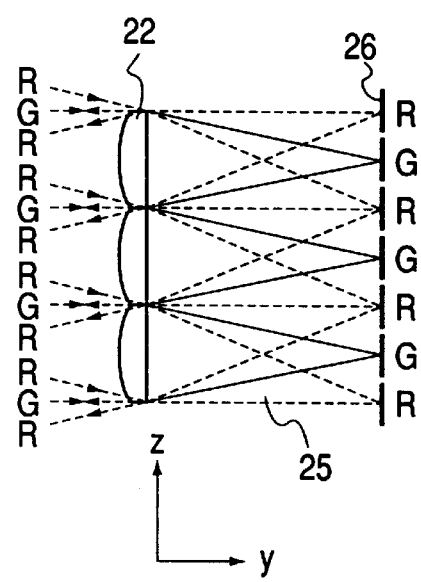
Figure 5B:
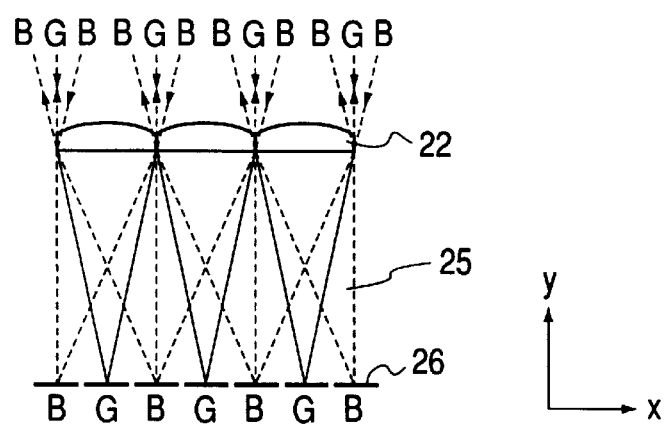

FIGS. 5A, 5B and 5C illustrate the principle of color resolution and color combination in the liquid crystal panel in the present embodiment. FIG. 5A is a typical top plan view of the liquid crystal panel 2, and FIGS. 5B and 5C are typical cross-sectional views of the liquid crystal panel taken along the line 5B—5B (x-direction) and the line 5C—5C (z-direction), respectively, of FIG. 5A.

FIG. 5C is a cross-sectional view corresponding to FIG. 4 representing yz cross-section, and shows the states of the incidence and emergence of G and R color lights entering each microlens 22. As can be seen from FIG. 5C, each G pixel electrode as a first color pixel is disposed right beneath the center of each microlens 22, and each R pixel electrode as a second color pixel is disposed right beneath the boundary between the microlenses 22. Accordingly, it is preferable that the angle of incidence θ of R light be set so that tan θ may become equal to the ratio between the pitch of the G and R pixels alternately arranged and the distance in y-direction between the microlens 22 and the pixel electrode 26.

On the other hand, FIG. 5B corresponds to the xy cross-section of the liquid crystal panel 2. As regards this xy cross-section, B pixel electrodes as third color pixels and G pixel electrodes as first color pixels are alternately arranged as in FIG. 5C, and each G pixel electrode is also disposed right beneath the center of each microlens 22, and each B pixel electrode as the third color pixel is disposed right beneath the boundary between the microlenses 2.

Now, the light beam B illuminating the liquid crystal panel 2, as previously described, is made into P-polarized light by the PBS 3, whereafter it obliquely enters the panel 2 in the cross-section (xy plane) in FIG. 5B and therefore, just as in the case of the light beam R, the light beam B which has entered each microlens 22 is reflected by the B pixel electrode formed of aluminum as shown, and emerges from a microlens adjacent to the microlens 22 which is has entered in x-direction in a form including S-polarized light. The polarization modulation by the liquid crystal layer 25 on the B pixel electrode and the projection of the emergent light from the liquid crystal panel 2 are similar to those of the aforedescribed G and R lights.

Also, each B pixel electrode is disposed right beneath the boundary between the microlenses 22, and it is preferable that the angle of incidence θ of the blue light B onto the liquid crystal panel 2 be set so that as in the case of the red light R, tan θ may become equal to the ratio between the pitch of the G and B pixels alternately arranged and the distance in y-direction between the microlens 22 and the pixel electrode 26.

Now, in the liquid crystal panel 2 according to the present embodiment, as described above, the arrangement of the R, G and B pixels is RGRGRG . . . for z-direction (first direction), and BGBGBG . . . for x-direction (second direction), and FIG. 5A shows the planar arrangement thereof.

The size of the color pixels in the arrangement direction thereof is about a half of the diameter of the microlenses 22 in a corresponding direction, both vertically and horizontally, and the pitch of the pixels is a half of the pitch of the microlenses 22 in a corresponding direction, both vertically and horizontally. Also, the G pixel is in terms of plane located right beneath the center of the microlenses 22, and the R pixel is located between the G pixels in z-direction and at the boundary between the microlenses 22, and the B pixel is located between the G pixels in x-direction and at the boundary between the microlenses 22. Also, the shape of a microlens is a square (the size of a side of which is twice as great as that of a side of the pixel).

Figure 6:
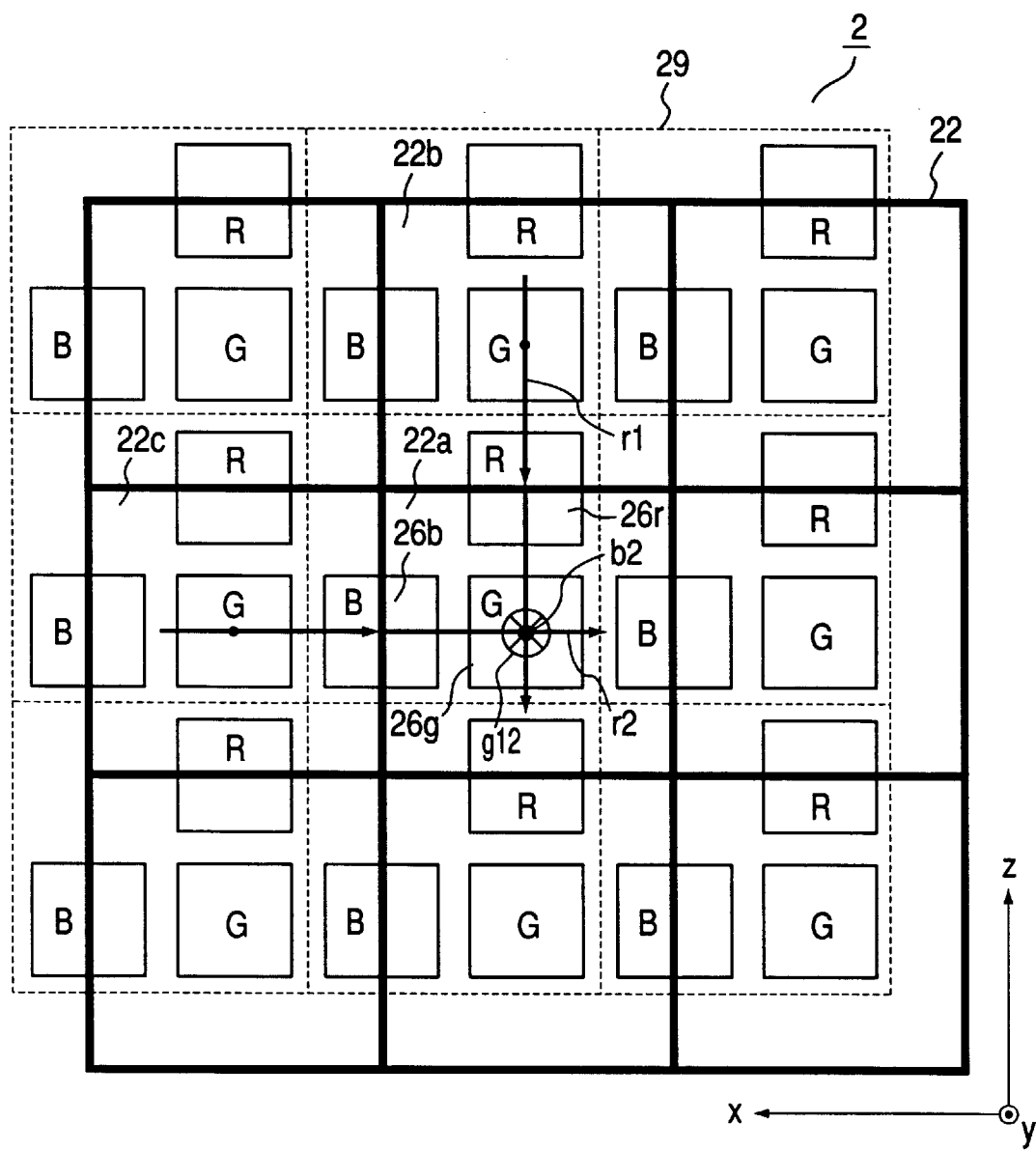
FIG. 6 is a fragmentary enlarged top plan view of the liquid crystal panel according to Embodiment 1 of the present invention.

FIG. 6 is an enlarged top plan view of a portion of the liquid crystal panel 2 according to the present embodiment. In FIG. 6, a broken line lattice 29 shows a pixel unit in which three R, G and B color pixels constituting a picture element are brought together.

Such pixel units 29 are two-dimensionally arranged in x-and z-directions at a predetermined pitch on a substrate to thereby constitute a pixel unit array. That is, when the R, G and B pixels are driven by the active matrix driving circuit portion 27 of FIG. 4, the pixel units 29 are driven by R, G and B image signals corresponding to the same picture element position.

Here, paying attention to a picture element comprising the R pixel electrode 26r, the G pixel electrode 26g and the B pixel electrode 26b, the R pixel electrode 26r is illuminated with the red light R emerging from the microlens 22b and obliquely entering it as indicated by arrow r1, and the red reflected light R emerges through the microlens 22a as indicated by arrow r2. The B pixel electrode 26b is illuminated with the blue light B emerging from the microlens 22c and obliquely entering it as indicated by arrow b1, and the blue reflected light B emerges also through the microlens 22a as indicated by arrow b2.

Also, the G pixel electrode 26g is illuminated with the green light G entering perpendicularly (in a direction toward the back of the plane of the drawing sheet) from the microlens 22a, as indicated by arrow g12 toward the front and rear, and the green reflected light G emerges perpendicularly (in a direction going out toward this side of the plane of the drawing sheet) through the same microlens 22a.

As described above, in the liquid crystal panel 2, with regard to the pixel unit 29 comprising the R, G and B color pixels constituting a picture element, the incidence positions of the illuminating lights of the three primary colors on the microlens array differ from one another, but their emergence position is one and the same microlens (in this case, the microlens 22a). This also holds true of all the other picture elements (R, G and B pixel units).

Figure 7:
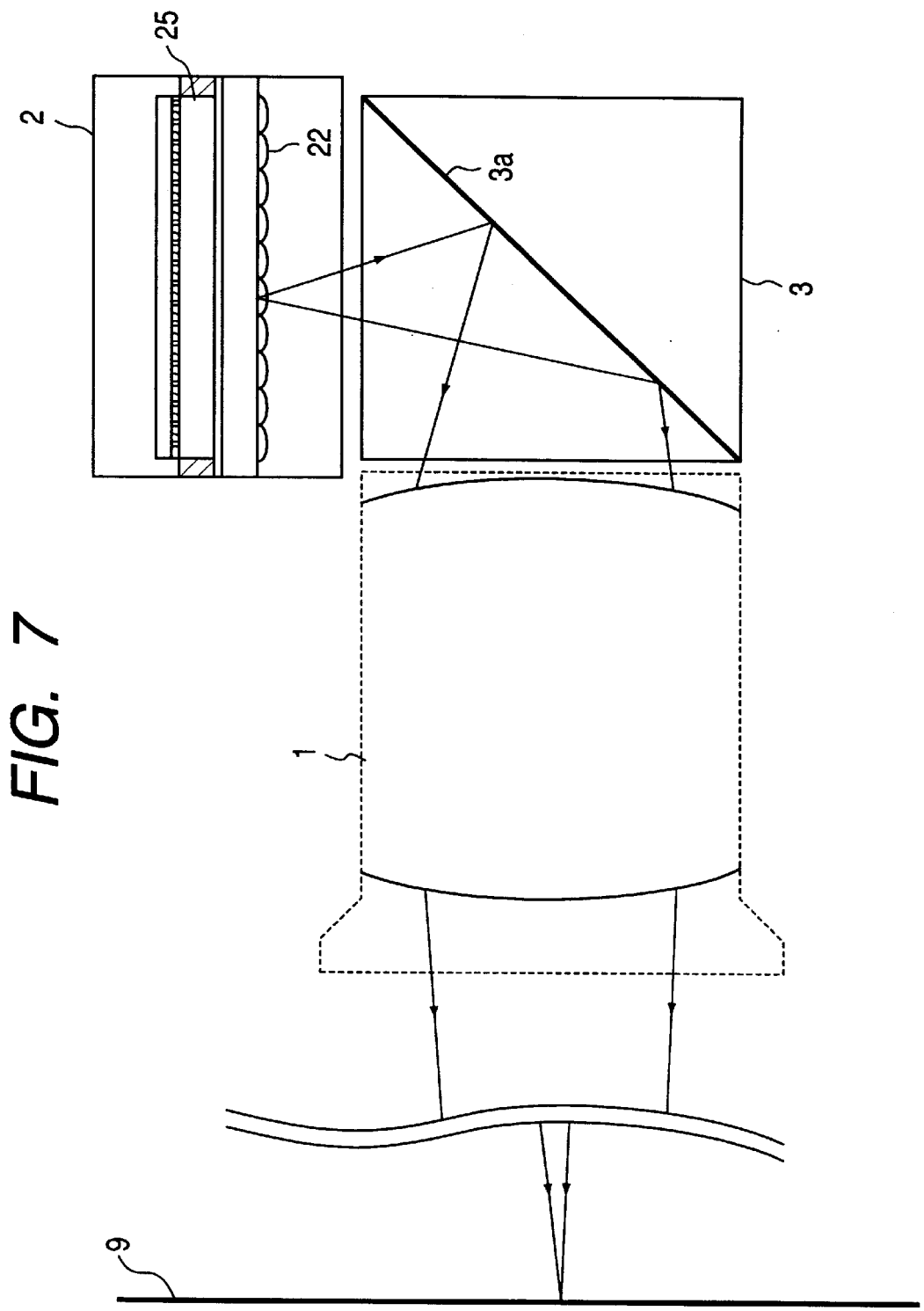
FIG. 7 shows the construction of a portion of the projection optical system of Embodiment 1 of the projection type display apparatus of the present invention.
Figure 9:
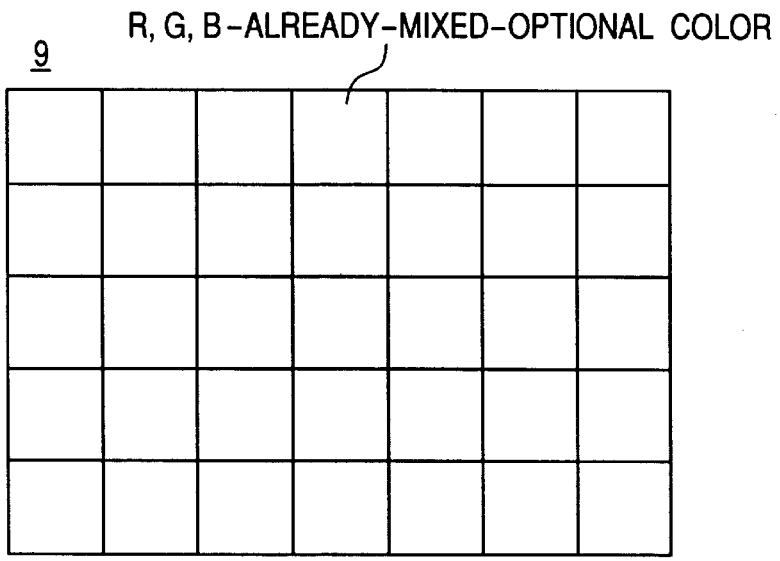
FIG. 9 is a fragmentary enlarged view of a projected image on a screen in Embodiment 1 of the projection type display apparatus of the present invention.

FIG. 7 is a schematic view when all the emergent lights from the liquid crystal panel 2 in the present embodiment are projected onto a screen 9 through the PBS 3 and the projection lens 1. When as shown in FIG. 7, the liquid crystal panel 2 shown in FIG. 6 is used and the optical system is adjusted so that the microlens array 22 in the liquid crystal panel 2 or the area near it may be imaged on the screen 9, the image enlargedly projected onto the screen 9 comes to have as its constituent unit a picture element in a state in which emergent lights from the R, G and B pixel units constituting a picture element in a lattice comprising a number of microlenses 22 as shown in FIG. 9 are mixed with one another in colors, that is, a state in which the same pixels are mixed with one another in colors.

In the present embodiment, the display panel 2 of the construction shown in FIG. 6 is thus used and the microlens array 22 on the light emergence side of the panel 2 or the vicinity thereof is made conjugate with the screen 9, whereby the display of a full color image of high quality free of the so-called R, G and B mosaic is made possible on the surface of the screen.

Detailed description will now be made of each pixel electrode 26 and the active matrix driving circuit portion 27 provided on a silicon semiconductor substrate 28 for actively driving the pixel electrodes 26.

Figure 15:
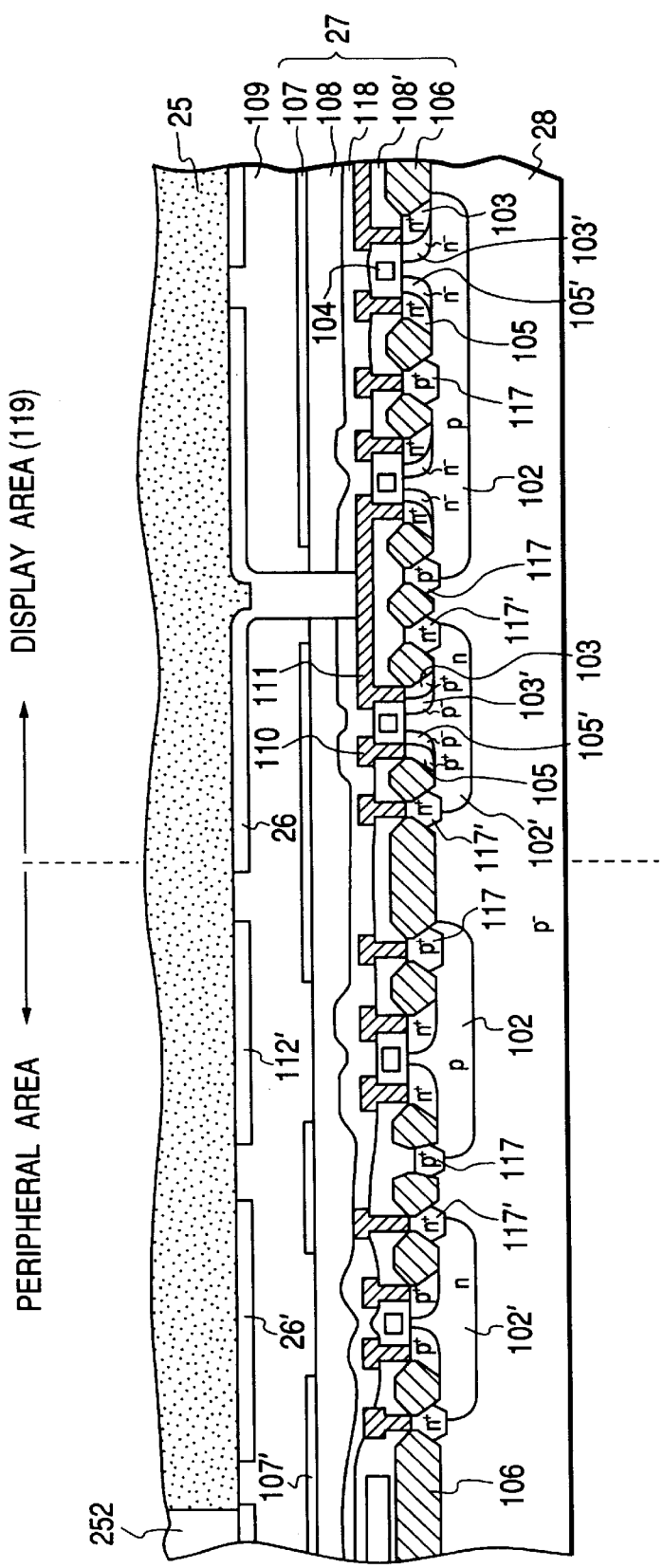
FIG. 15 is a typical cross-sectional view of an active matrix driving circuit portion in a liquid crystal panel according to the present invention.

FIG. 15 is a typical cross-sectional view of the active matrix driving circuit portion 27 of the liquid crystal panel 2 according to the present invention. In FIG. 15, the reference numeral 28 designates a silicon substrate (semiconductor substrate), the reference numerals 102 and 102' denotes a p type well and an n type well, respectively, the reference numerals 103 and 103' designate the drain areas of transistors, the reference numeral 104 denotes a gate, and the reference numerals 105 and 105' designate source areas.

As can be seen from FIG. 15, the transistor in the display area is not formed with a source layer and a drain layer self-adjustingly to the gate, but is endowed with an offset, and therebetween, n-layers and p-layers of low density are provided as indicated in the drain areas 103' and the gates 105'. The amount of this offset is preferably 0.5 to 2.0 $\mu$m.

On the other hand, some circuit portions of the peripheral circuit are shown in FIG. 15, and some circuits of the peripheral portion are formed with a source layer and a drain layer self-adjustingly to the gate.

While the offset of the source and drain has been described here, not only the presence or absence of the offset, but also a change in the amount of the offset in conformity with the withstand pressure or the optimization of the length of the gate is effective. A portion of the peripheral circuit is a logic system circuit, and this portion may be the above-mentioned 1.5 to 5 V system driving and therefore, the above-described self-adjusting structure is provided to reduce the size of the transistors and improve the driving force of the transistors.

The semiconductor substrate 28 comprises a p type semiconductor, and the substrate 28 is of minimum potential (usually the ground potential), and in the case of the display area, the n type well requires a voltage applied to the pixels, i.e., 10 to 15 V, while on the other hand, the logic portion of the peripheral circuit requires a logic driving voltage of 1.5 to 5 V. By this structure, optimum devices conforming to the respective voltages can be constructed, and it becomes possible to realize not only a reduction in chip size, but also high pixel display by an improved driving speed.

The reference numeral 106 designates field oxidizes film, the reference numeral 110 denotes source electrodes connected to data wiring, the reference numeral 111 designates a drain electrode connected to the pixel electrode 26. The reference numeral 107 denotes a light intercepting layer covering a display area and a peripheral area, and Ti, TiN, W, Mo or the like is suitable as this light intercepting layer 107.

As can be seen from FIG. 15, the light intercepting layer covers the display area except the connecting portion between the pixel electrode and the source electrode, but is designed in the peripheral pixel area to cover the pixel electrode layer when the illuminating light mixes into a portion from which the light intercepting layer has been removed to thereby cause the malfunctioning of the circuit, except for the light intercepting layer in an area wherein wiring capacity such as some image signal lines and a clock line becomes heavy, and is contrived so as to be capable of transferring a high speed signal.

The reference numeral 108 designates an insulating layer in the lower portion of the light intercepting layer, and a P-SiO layer has been subjected to the flattening process by SOG, and that layer has been further covered with P-SiO to thereby secure the stability of the insulating layer. Of course, besides the flattening by SOG, P-TEOS film may be formed and P-SiO is covered, whereafter the insulating layer may be CMP-processed and flattened.

The reference numeral 109 denotes an insulating layer provided between a reflection electrode and the light intercepting layer, and the charge holding capacity of the reflection electrode is provided through this insulating layer. For the formation of a great capacity, laminated film of P-SiN, $Ta_2O_5$ and $SiO_2$ of high dielectric constant is effective besides $SiO_2$. The light intercepting layer is provided on a flat metal such as Ti, TiN, Mo or W, whereby a film thickness of the order of 500 to 5000 angstrom is suitable.

The reference numeral 25 designates a liquid crystal material, the reference numerals 117 and 117' denote high density impurity areas, and the reference numeral 119 designates a display area.

As can be seen from FIG. 15, the high density impurity layers 117 and 117' identical in polarity to the well formed in the lower portion of the transistor are formed on the peripheral portion and interior of the well, and even if a signal of high amplitude is applied to the source, the potential of the well is stable because it is fixed at desired potential in a low resistance layer, and therefore image display of high quality can be realized. Further, between the n type well and the p type well, the high density impurity layers 117 and 117' are provided through field oxidized film, whereby a channel stop layer right beneath the field oxidized film usually used in the case of an MOS transistor is made unnecessary.

These high density impurity layers can be formed at a time by the source and drain layer forming process and therefore, the number of masks and the number of steps in the manufacturing process could be curtailed to thereby achieve a reduction in cost.

Figure 16:
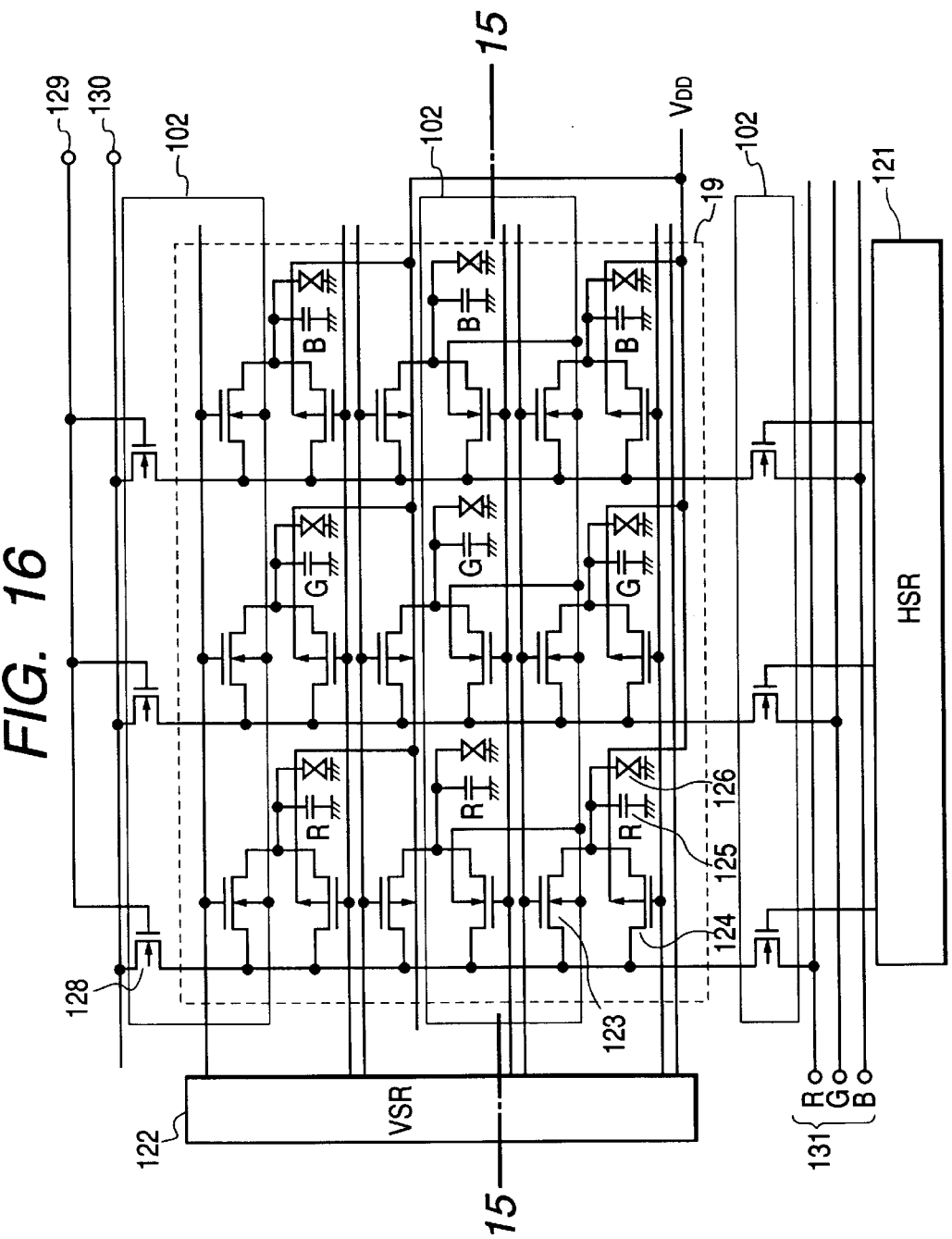
FIG. 16 is a circuit diagram of the active matrix driving portion in the liquid crystal panel according to the present invention.

FIG. 16 is a circuit diagram of the active matrix driving portion 27 of the liquid crystal panel 2 in the present embodiment.

In FIG. 16, the reference numeral 121 designates a horizontal shift register, the reference numeral 122 denotes a vertical shift register, the reference numeral 123 designates an n channel MOSFET, the reference numeral 124 denotes a p channel MOSFET, the reference numeral 125 designates a holding capacity, the reference numeral 126 denotes a liquid crystal pixel capacity, the reference numeral 127 designates a signal transfer switch, the reference numeral 128 denotes a reset switch, the reference numeral 129 designates a reset pulse input terminal, the reference numeral 130 denotes a reset power source terminal, and the reference numeral 131 designates R, G and B image signal input terminals.

While in FIG. 15, the silicon semiconductor substrate 28 is of p type, it may be of n type. Also, the well area 102 is of an electrically conductive type opposite to the semiconductor substrate 28. Therefore, in FIG. 15, the well area 102 is of p type. It is desirable the p type and n type well areas 102 and 102' have impurities poured thereinto at higher density than the semiconductor substrate 28, and it is desirable that when the density of the impurities of the semiconductor substrate 28 is $10^{14}$ to $10^{15}(cm^{-3})$, the density of the impurities of the well area 102 be $10^{15}$ to $10^{17}(cm^{-3})$.

The source electrode 110 is connected to data wiring to which a signal for display is sent, and the drain electrode 111 is connected to the pixel electrode 26. Al, AlSi, AlSiCu, AlGeCu or AlCu wiring is usually used as these electrodes 110 and 111. When a barrier metal layer formed of Ti and TiN is used in the lower portions of these electrodes 110 and 111, contact can be realized stably. Also, contact resistance can be reduced.

It is desirable that the pixel electrode 26 have a flat surface and have a high reflectance, and it is possible to use a material such as Cr, Au or Ag besides Al, AlSi, AlSiCu, AlGeCu and AlCu which are ordinary metals for wiring. Also, to improve the flatness of the pixel electrode 26, the ground insulating layer and the surface of the pixel electrode 26 can preferably be processed by the chemical mechanical polishing (CMP) method.

The holding capacity 125 shown in FIG. 16 is a capacity for holding the signal between the pixel electrode 26 shown in FIG. 15 and the opposed transparent electrode 24. Substrate potential is applied to the well area 102.

In the present embodiment, the transmission gate construction in respective rows is made into a construction in which the order is changed in adjacent rows so that in the first row from above, an n channel MOSFET 123 may be upper and a p channel MOSFET 124 may be lower and in the second row, a p channel MOSFET 124 may be upper and an n channel MOSFET 123 may be lower. As described above, not only in the stripe type well, the periphery of the display area is in contact with a power source line, but also in the display area, a thin power source line is provided and contact is made therewith.

At this time, the stabilization of the resistance of the well becomes a key. Accordingly, in the case of a p type substrate, there has been adopted a construction in which the area of contact or the number of contacts in the display area of the n well is augmented more than the contact in the p well. The p well is a p type substrate in which constant potential is adopted and therefore, the substrate plays the role of a low resistance body. Accordingly, the influence of the swing by the inputting and outputting of a signal to the source and drain of the n type well which becomes stripe-like is liable to become great, but it can be prevented by augmenting the contact from the upper wiring layer, whereby stable display of high quality can be realized.

R, G and B image signals (such as video signals and pulse-modulated digital signals) are inputted from the image signal input terminal 131, and are outputted to each data wiring with the signal transfer switch 127 opened and closed in conformity with a pulse from the horizontal shift register 121. From the vertical shift register 122, a high pulse is applied to the gate of the n channel MOSFET 123 in the selected row and a low pulse is applied to the gate of the p channel MOSFET.

As described above, the switch of the pixel portion is comprised of a CMOS transmission gate of single crystal, and has the advantage that a signal written into the pixel electrode does not depend on the therehold value of MOSFET, but the signal of the source can be fully written in.

Also, the switch comprises a single crystal transistor and is free of unstable behavior or the like in the grain boundary of poly Si-TFT, and highly reliable high-speed driving free of irregularity can be realized.

Also, the active matrix driving circuit portion 27 as described above is present under each pixel electrode 26 and therefore, in the circuit diagram of FIG. 16, the R, G and B pixels constituting a picture element are simply depicted as being laterally arranged, but the drain of each pixel FET is connected to the two-dimensionally arranged R, G and B pixel electrodes 26 as shown in FIG. 6.

Another example of the construction of the driving circuit around the panel will now be described with reference to FIG. 17.

Figure 17:
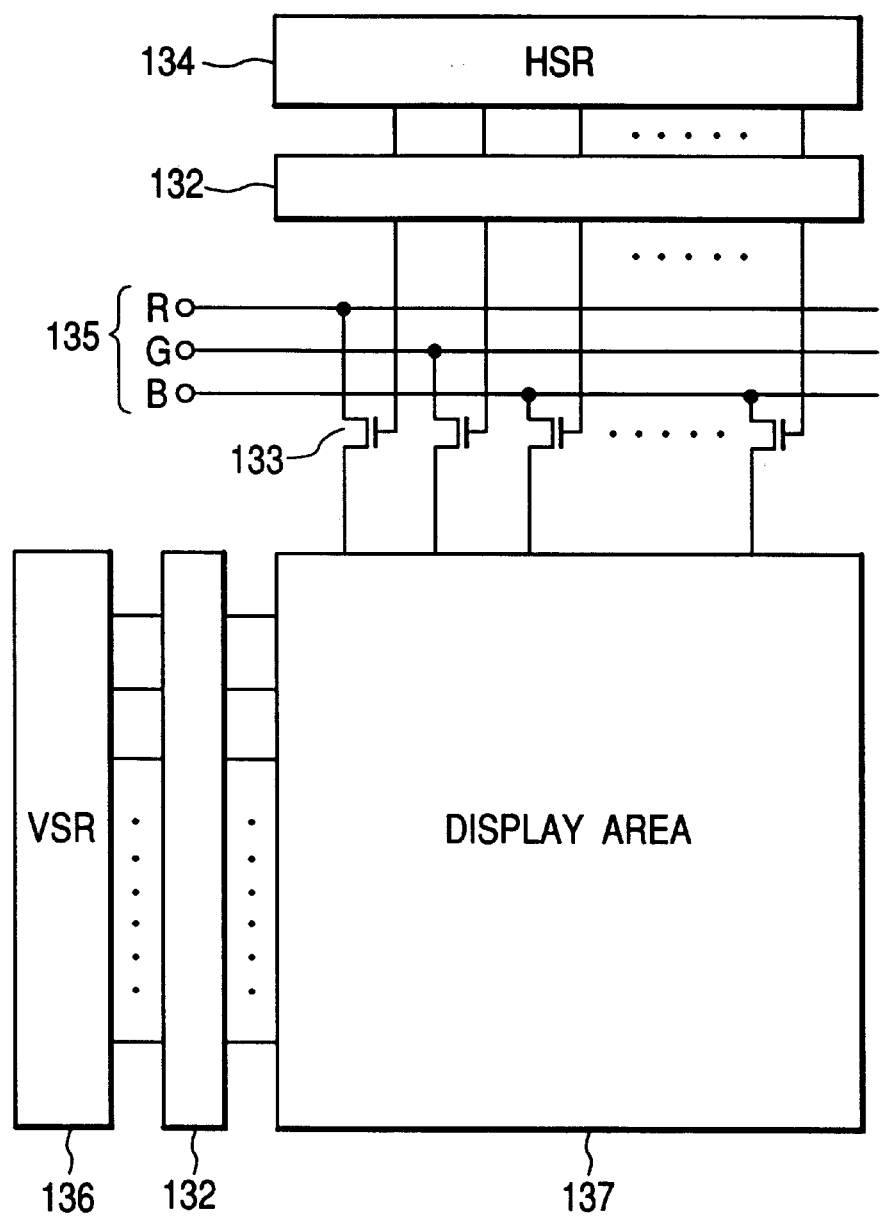
FIG. 17 is a typical block diagram of the peripheral driving circuit (another form) of the liquid crystal panel according to the present invention.

FIG. 17 is a typical block diagram showing another example of the construction of the driving circuit around the panel. In FIG. 17, the reference numeral 132 designates a level shifter circuit, the reference numeral 133 denotes image signal sampling switches, the reference numeral 134 designates a horizontal shift register, the reference numeral 135 denotes R, G and B image signal input terminals, the reference numeral 136 designates a vertical shift register, and the reference numeral 137 denotes a display area.

By the construction described above, the logic circuits such as the H and V shift registers could be driven at a very low value of the order of 1.5 to 5 V, irrespective of the amplitude of the video signal, and a higher speed and a lower consumption voltage could be achieved. The horizontal and vertical shift registers here can be scanned in both directions by a selection switch, and can cope with a change in the disposition or the like of the optical system without any change of the panel, and there is the merit that the same panel can be used even in a different series of products and a lower cost can be achieved.

Also, in FIG. 17, the image signal sampling switches 133 each have already been described as being comprised of a transistor of one side polarity, whereas this is not restrictive, but of course, each of them may be comprised of a CMOS transmission gate, whereby all of input image signals can be written into the signal line.

Also, when the CMOS transmission gate construction is adopted, there is the problem that swing occurs to the image signals due to the difference in area between an NMOS gate and a PMOS gate and the difference in overlapping capacity between the gate and the source or the drain. To prevent this, the source and drain of an MOSFET of about ½ of the gate length of the MOSFET's of the sampling switches 133 of respective polarities are connected to the signal line, and a pulse of the opposite phase is applied thereto, whereby the swing could be prevented and a very good image signal has been written into the signal line. Thus, display of higher quality has become possible.

Figure 18:
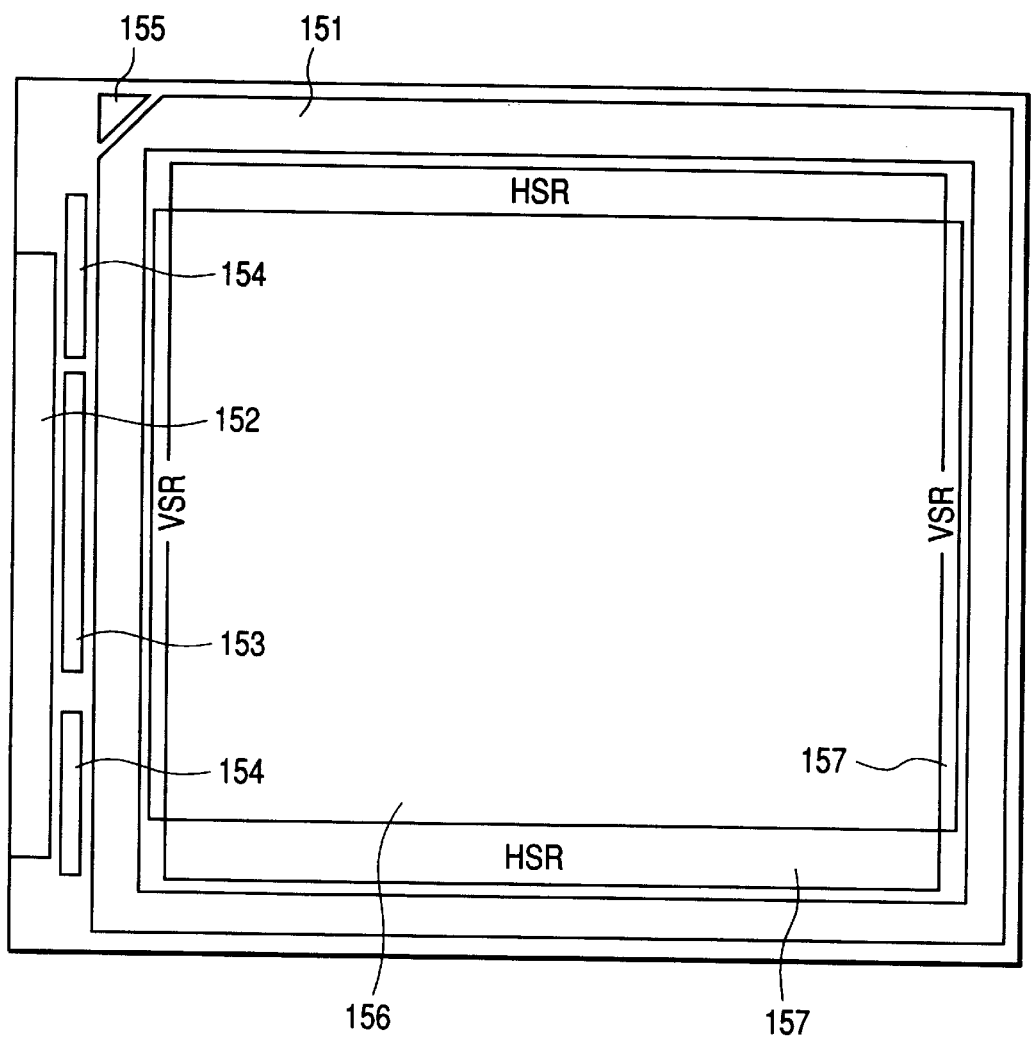
FIG. 18 is a typical general plan view of the liquid crystal panel according to the present invention.

FIG. 18 is a typical plan view for illustrating the relation between seal structure and panel structure. In FIG. 18, the reference numeral 151 designates a seal material, the reference numeral 152 denotes an electrode pad, the reference numeral 153 designates a clock buffer circuit, and the reference numeral 154 denotes an amplifier. This amplifier is used as an output amplifier during the inspection of panel electricity. The reference numeral 155 designates an Ag paste portion for taking the potential of an opposed substrate, the reference numeral 156 denotes a display area, and the reference numeral 157 designates a peripheral driving circuit portion such as SR.

As can be seen from FIG. 18, in the present embodiment, circuits are provided in both the interior and exterior of the seal so that the total chip size may be become small. In the present embodiment, the drawing-out of the pad is concentrated in one of the sides of the panel, but may be on the longer side, and the taking-out not from a side but from a plurality of sides is also effective when a high-speed clock is handled.

Further, the liquid crystal panel (panel) according to the present embodiment uses an Si semiconductor substrate and therefore, when as in a projection type display apparatus, strong light is applied thereto and light also impinges on the side walls of the substrate, the potential of the substrate may be fluctuated to thereby cause the wrong operation of the liquid crystal panel. Accordingly, the peripheral circuit portion of the display area on the side walls and upper surface of the liquid crystal panel is a substrate holder capable of intercepting light, and the back of the Si substrate is holder structure to which a metal such as Cu having high heat conductivity is connected through an adhesive agent having high heat conductivity.

Description will now be made of a reflection electrode structure in the present embodiment and a method of making it. The completely flattened reflection electrode structure in the present embodiment is made by a novel method, unlike an ordinary method of patterning a metal, and then polishing it, of subjecting an electrode pattern to the etching of a groove in advance, forming a metal into film there, removing the metal on an area on which the electrode pattern is not formed and also, flattening the metal on the electrode pattern. Moreover, the width of wiring is much greater than that of the other area than the wiring, and according to the common knowledge of the conventional etching apparatus, there arises the problem that when etching is done, polymer accumulates during the etching and patterning becomes impossible and thus, the structure in the present embodiment cannot be made.

So, an attempt has been made to write a condition in the conventional oxidized film origin etching ($CF_4/CHF_3$ system).

Figure 19A:
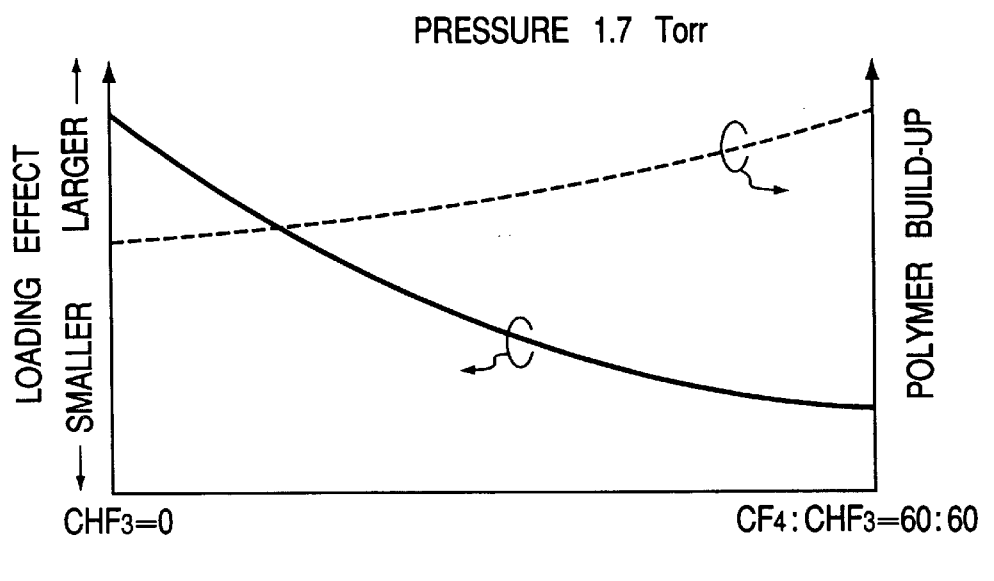
FIGS. 19A and 19B are graphs showing the etching characteristics of reflection electrodes in the liquid crystal panel according to the present invention.
Figure 19B:
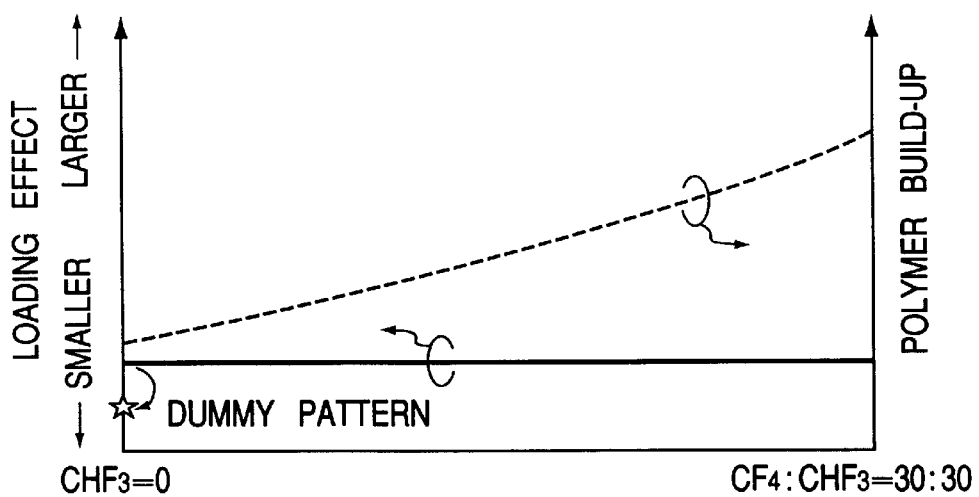

FIGS. 19A and 19B are graphs showing the quality of the etching process in the manufacture of the liquid crystal panel according to the present invention. FIG. 19A shows a conventional case where the total pressure is 1.7 torr, and FIG. 19B shows the case of the present embodiment where the total pressure is 1.0 torr.

It can be seen that when gas $CFH_3$ of a deposition property is decreased under the conventional condition, the volume of polymer certainly decreases, but the dimensional difference between a pattern near the resist and a pattern far from the resist (the loading effect) becomes very great and this gas cannot be used.

It has been found this time that as the pressure is gradually reduced to suppress the loading effect, the loading effect is considerably suppressed when the pressure becomes equal to or less than 1 torr, and the etching by $CF_4$ alone in which $CHF_3$ is made zero is effective.

Further, little or no resist is present in the pixel electrode area, and the peripheral portion is occupied by resist. Accordingly, it has been found that it is difficult to form a structure and it is effective to provide as the structure a shape equal to the pixel electrode up to the peripheral portion of the display area.

By adopting the present structure, there has been obtained the effect that the level difference with respect to the display portion and the peripheral portion or the seal portion which has heretofore been present becomes null and gap accuracy becomes high and not only the uniform pressure in the surface becomes high, but also the irregularity during pouring decreases and images of high quality can be formed with a good yield.

Figure 8:
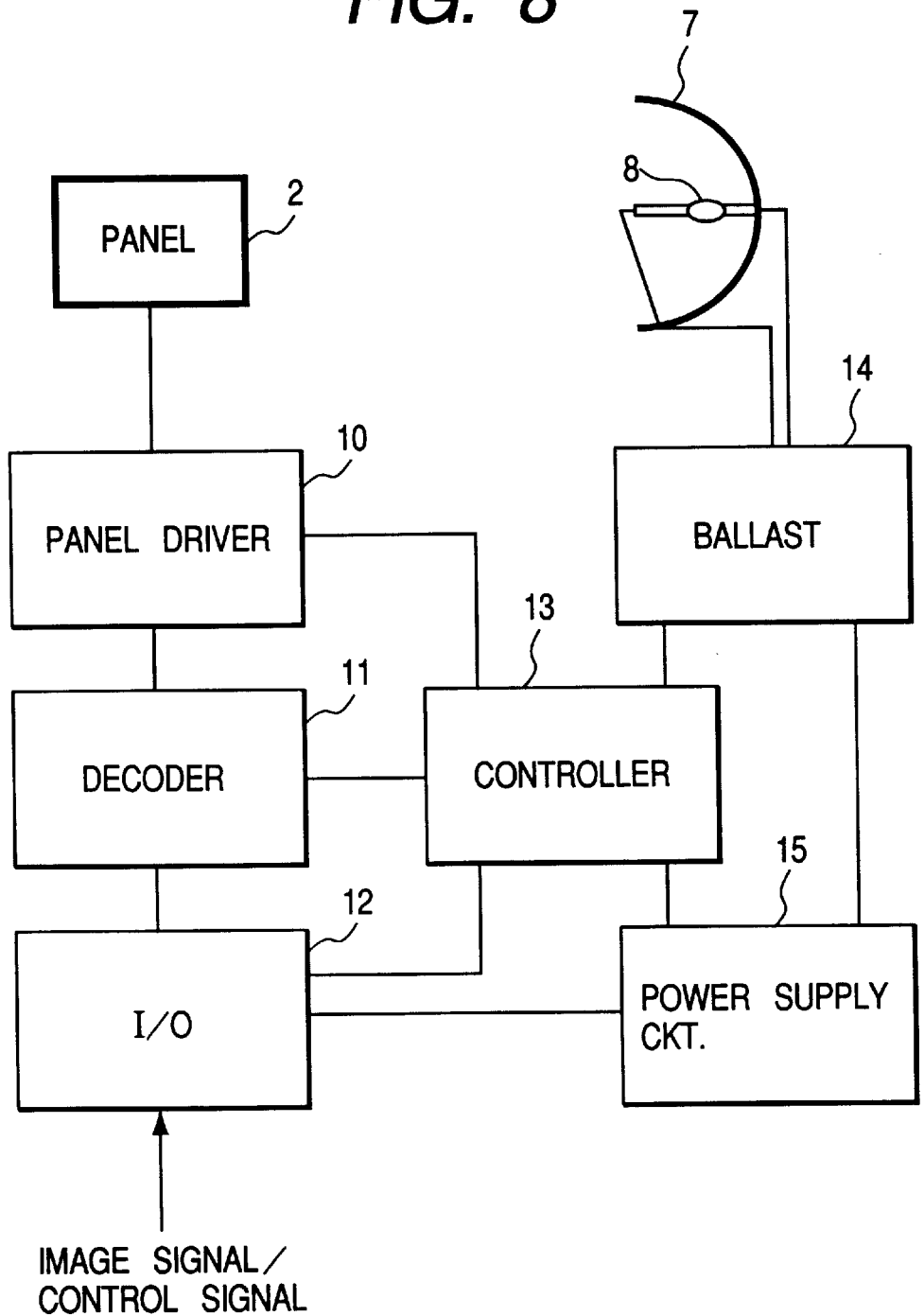
FIG. 8 is a block diagram showing the driving circuit of Embodiment 1 of the projection type display apparatus of the present invention.

FIG. 8 is a general block diagram of the driving circuit system of a projection type liquid crystal display apparatus according to the present invention.

In FIG. 8, there reference numeral 10 designates a panel driver which reverses the polarity of R, G and B image signals and forms a liquid crystal driving signal subjected to predetermined voltage amplification, and also forms a driving signal for the opposed electrode 24, and various timing signals or the like. The reference numeral 12 denotes an interface which decodes various image and control transmission signals into standard image signals or the like. The reference numeral 11 designates a decoder which decodes the standard image signals from the interface 12 into R, G and B primary color image signals and synchronous signals. The reference numeral 14 denotes ballast which drives and turns on an arc lamp 8. The reference numeral 15 designates a power supply circuit which supplies a power source to each circuit block. The reference numeral 13 denotes a controller containing an operating portion, not shown, therein, which synthetically control each of the above-mentioned circuit blocks.

As described above, the driving circuit system of the projection type liquid crystal display apparatus according to the present embodiment is very popular as a single plate type projector and a burden is not particularly applied to the driving circuit system, and a color image of good quality free of the R, G, B mosaic as previously described can be displayed.

Figure 10:
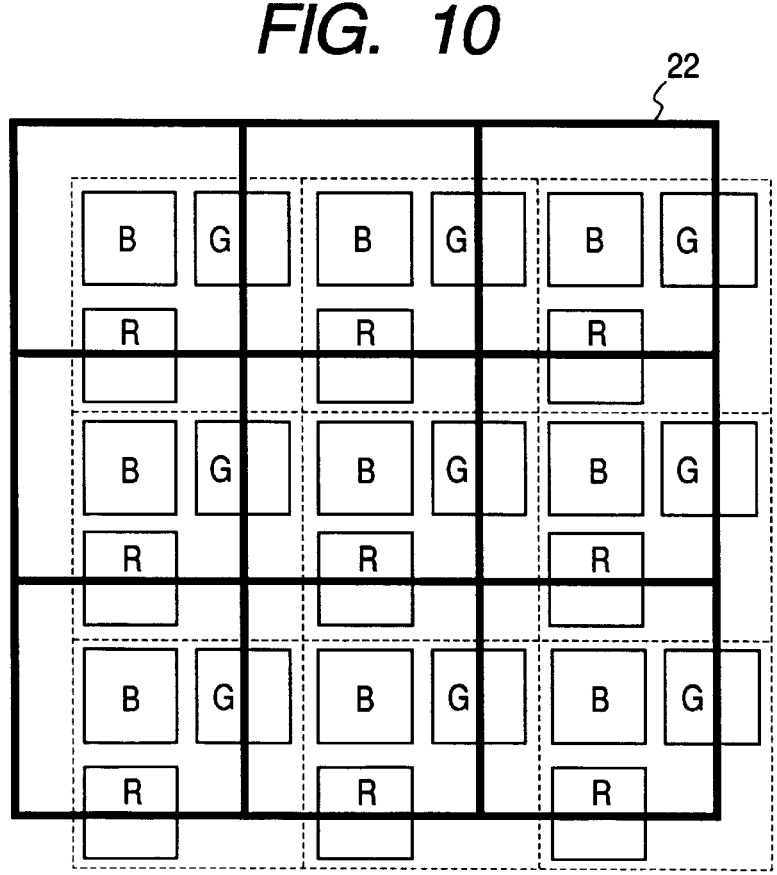
FIG. 10 is a fragmentary enlarged top plan view of another form of the liquid crystal panel according to Embodiment 1 of the present invention.

FIG. 10 is a fragmentary enlarged plan view of another form of the liquid crystal panel in the present invention. Here, blue B pixels are arranged as first color pixels right beneath the centers of the microlenses 22, and green G pixels are arranged as second color pixels alternately with the B pixels in the left and right direction of the B pixels, and R pixels are arranged as third color pixels alternately with the B pixels in the vertical direction of the G pixels.

By such an arrangement, an effect entirely similar to that of the previous example can be obtained by causing the blue light B to enter the liquid crystal panel perpendicularly thereto and causing the red light R and the green light G to enter the liquid crystal panel obliquely thereto so that the reflected light from a unit of R, G and B pixels constituting a picture element may emerge a common microlens. Further, R pixels may be arranged as first color pixels right beneath the centers of the microlenses 22, and one of G and B color pixels may be arranged alternately with R pixels in the left to right direction and the other of G and B color pixels may be arranged alternately with R pixels in the vertical direction.

FIG. 11 is a schematic view of the essential portions of a liquid crystal panel 20 according to Embodiment 2 of the present invention. FIG. 11 shows a fragmentary enlarged cross-sectional view of the liquid crystal panel 20. The differences of Embodiment 2 from Embodiment 1 are that sheet glass 23 is used as the opposed glass substrate and that microlenses 220 are formed on the sheet glass 23 by the so-called reflow method using thermoplastic resin. Further, spacer ports 251 are formed on non-pixel portions by the photolithography of photo-sensitive resin.

Figure 12A:
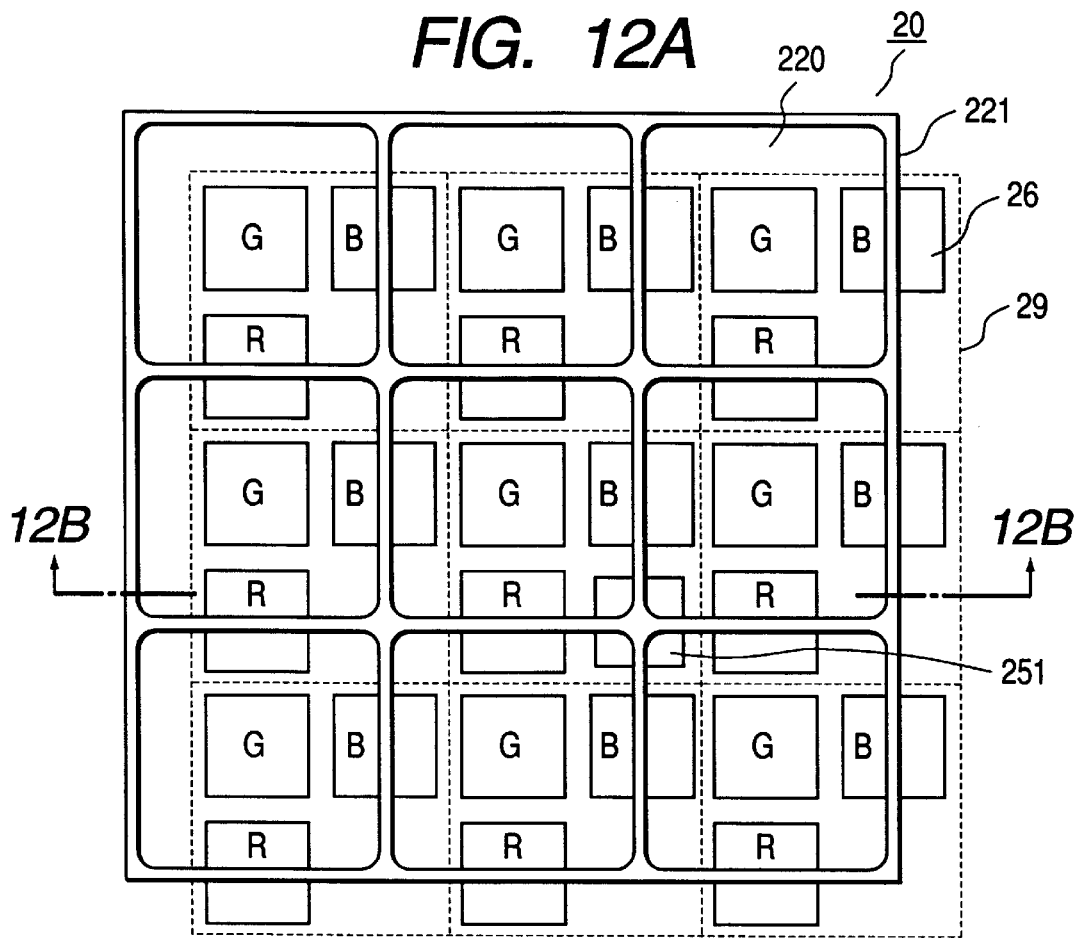
FIGS. 12A and 12B are a fragmentary enlarged top plan view and a fragmentary enlarged cross-sectional view, respectively, of the liquid crystal panel according to Embodiment 2 of the present invention.
Figure 12B:
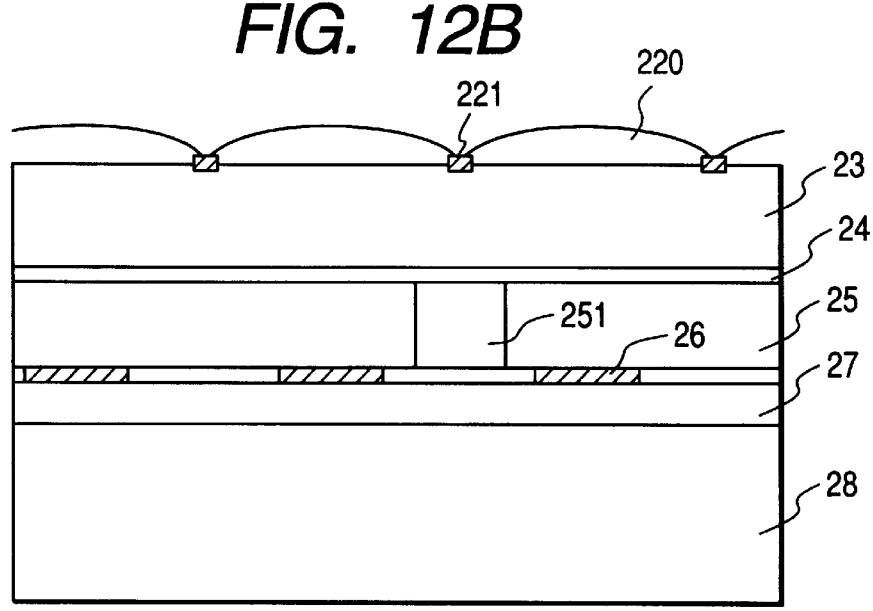

FIG. 12A is a fragmentary top plan view of the liquid crystal panel 20. As can be seen from this figure, the spacer posts 251 are formed in the non-pixel areas at the corners of the microlenses 220 at a predetermined pitch. A cross-section 12B—12B passing through these spacer posts 251 is shown in FIG. 12B. It is preferable that these spacer posts 251 be provided in a matrix form at 10 to 100 pixel pitch and it is necessary that the formation density thereof be set so as to satisfy both of the parameters of the planarity of the sheet glass 23 and the pourability of liquid crystal which are contrary to the number of spacer posts.

Also, in the present embodiment, there is provided a light intercepting layer 221 formed by a pattern comprising metallic film, and it prevents the entry of any leaking light from the boundary portions among the microlenses. Thereby, a reduction in the chromaticness of a projected image by such leaking light (due to the mixing of the three primary color image lights R, G and B) and a reduction in contrast are prevented. Accordingly, by using the present liquid crystal panel 220 to construct a projection type display apparatus as in Embodiment 1, there are obtained more modulated good images.

Figure 20:
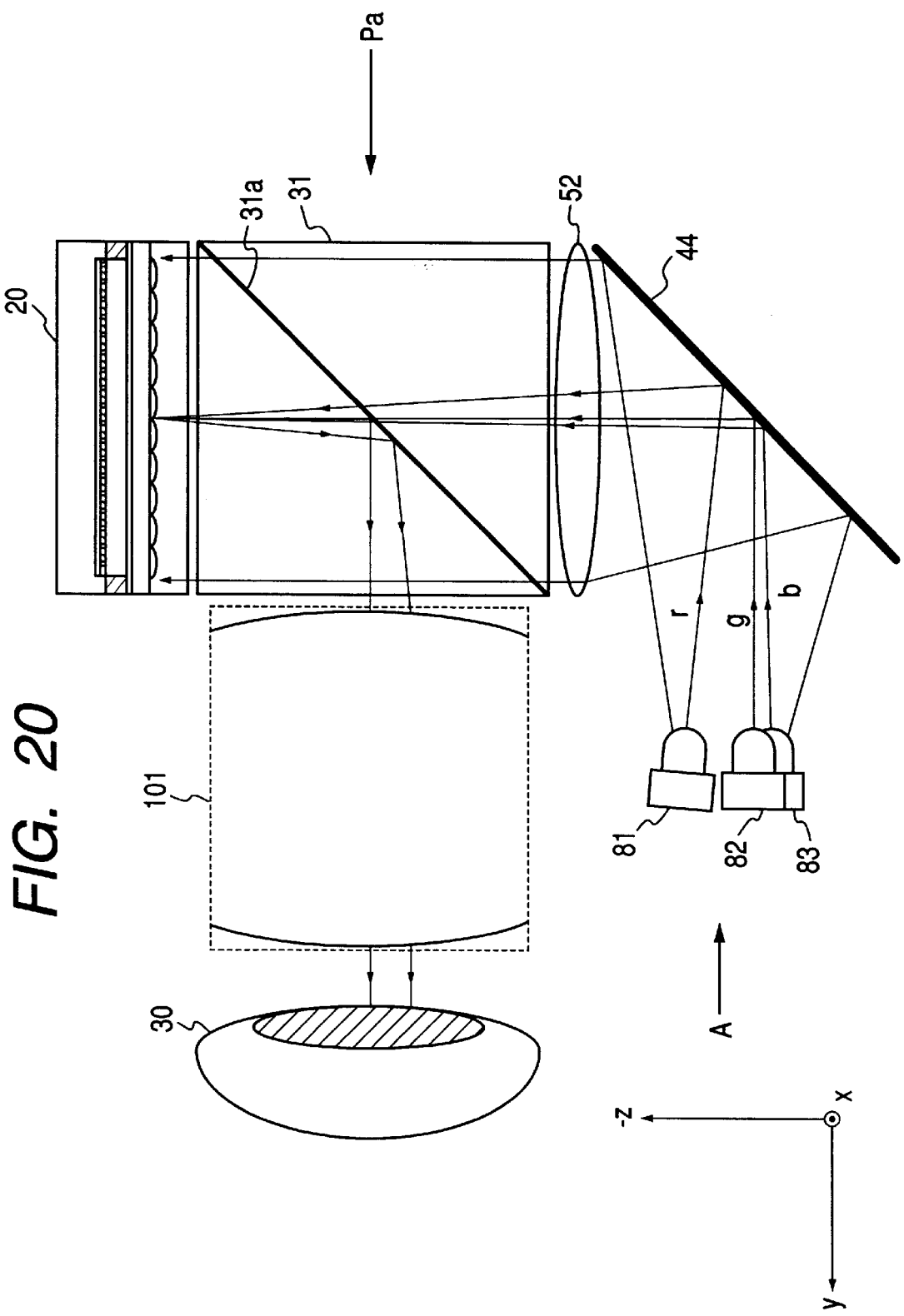
FIG. 20 is a typical view showing the general construction of Embodiment 3 of the direct viewer type liquid crystal display apparatus of the present invention.

FIG. 20 is a schematic view of the essential portions of Embodiment 3 of the projection type liquid crystal display apparatus of the present invention. FIG. 20 typically shows the general construction of a direct viewer type display apparatus using a reflection type liquid crystal panel.

In FIG. 20, the reference numeral 101 designates an eyepiece, the reference numeral 20 denotes the liquid crystal panel shown in the aforedescribed Embodiment 2, the reference numeral 31 designates a PBS (polarizing beam splitter), the reference numeral 52 denotes a field lens, the reference numeral 44 designates a total reflection mirror, and the reference numerals 81, 82 and 83 denote an R-LED (red light emitting diode), a G-LED (green light emitting diode) and a B-LED (blue light emitting diode), respectively, and these are laid out as shown.

First, R, G and B light beams emitted from the LED's 81, 82 and 83 corresponding to the three primary colors are reflected by the mirror 44, whereafter they illuminate the liquid crystal panel 20 through the field lens 52 and the PBS 31. The field lens 52 collimates the widened light beams (divergent light beams) from the LED's 81, 82 and 83, and the PBS 31 takes out only P-polarized lights from the primary color illuminating lights. Further, the liquid crystal panel 20 is such that the direction in which the two-dimensional arrangement of a plurality of R, G and B pixels is RGRG is the y-axis direction and the direction in which the two-dimensional arrangement of the plurality of R, G and B pixels is BGBG is the x-axis direction.

Figure 21:
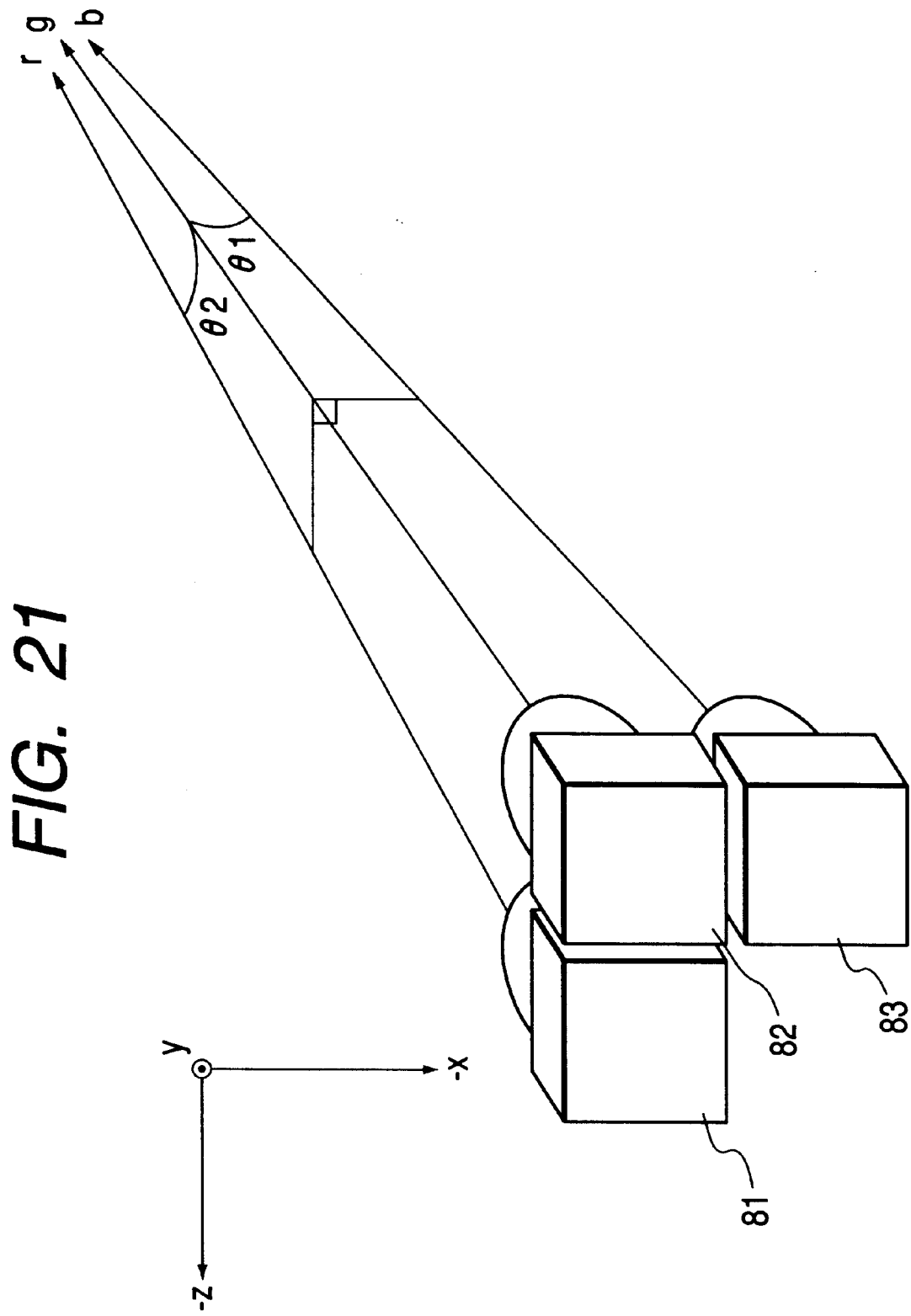
FIG. 21 is a perspective view of the rear surfaces of the R, G and B LED's of FIG. 20.

FIG. 21 illustrates the disposition of the LED's 81, 82 and 83. FIG. 21 shows a rear surface perspective view from the direction of arrow A in FIG. 20. As can be seen from this figure, the R-LED 81 is located at a position adjacent in the z-axis-direction to the G-LED 82, and the B-LED 83 is located at a position adjacent in the x-axis-direction to the G-LED 82, and the directions of the respective LED's are set so that the principal rays r, g and b (arrows in FIG. 21) of the emergent lights from the LED's may travel toward the central position of the liquid crystal panel 20 via the respective optical parts.

Further, the G-LED 82 is disposed so that after the emergent light beam therefrom has been collimated by the field lens 52, it may enter and illuminate the liquid crystal panel 20 perpendicularly thereto with the principal ray g (arrow g in FIG. 21). Also, the emergent light (blue) from the B-LED 81, as indicated by the principal ray b (arrow b in FIG. 21), illuminates the liquid crystal panel 20 in a state collimated by the field lens 52, from an oblique direction inclined by an angle θ1 in the x-axis direction with respect to the G light entering the liquid crystal panel 20 perpendicularly thereto.

The emergent light (red) from the R-LED 83, as indicated by the principal ray r (arrow in FIG. 21), emerges at first from a direction inclined by an angle θ2 in the z-axis direction with respect to the G light, but after it has been reflected by the mirror 44, it illuminates the liquid crystal panel 20 in a state collimated by the field lens 52, from an oblique direction inclined by an angle θ2 in the y-axis direction with respect to the G light entering the liquid crystal panel 20 perpendicularly thereto.

The reflected light having polarization-modulated image information (reflected image light) from the liquid crystal panel 20 has its S-polarized light reflected by the PBS surface 31a of the PBS 31, whereafter the image thereof is directly observed through the eyepiece 101 and the iris of an eye 30.

Accordingly, the focus position at that time is adjusted to the microlens position in the liquid crystal panel 20, whereby a modulated good full color view image of identical mixed color pixels free of mosaic is obtained by a principle entirely similar to that of the aforedescribed Embodiment 1.

Also, in the present embodiment, as indicated by arrow Pa in FIG. 20, external light can be made to come into the eyepiece through the PBS 31 and therefore, it is possible to endow the embodiment with the see-through function.

Now, in the present embodiment as well as in the previous embodiment, the PBS 31 is used as a polarizing element, but in order to reduce the cost and weight, use may be made of reflection type polarizable film such as DBEF produced by 3M Inc. disposed obliquely so as to correspond to the PBS surface, instead of the PBS 31. Further, in that case, in order to improve the degree of polarization (the purity of linear polarization), polarizing plates may be provided at positions corresponding to the incidence plane and emergence plane of the PBS 31.

Figure 22:
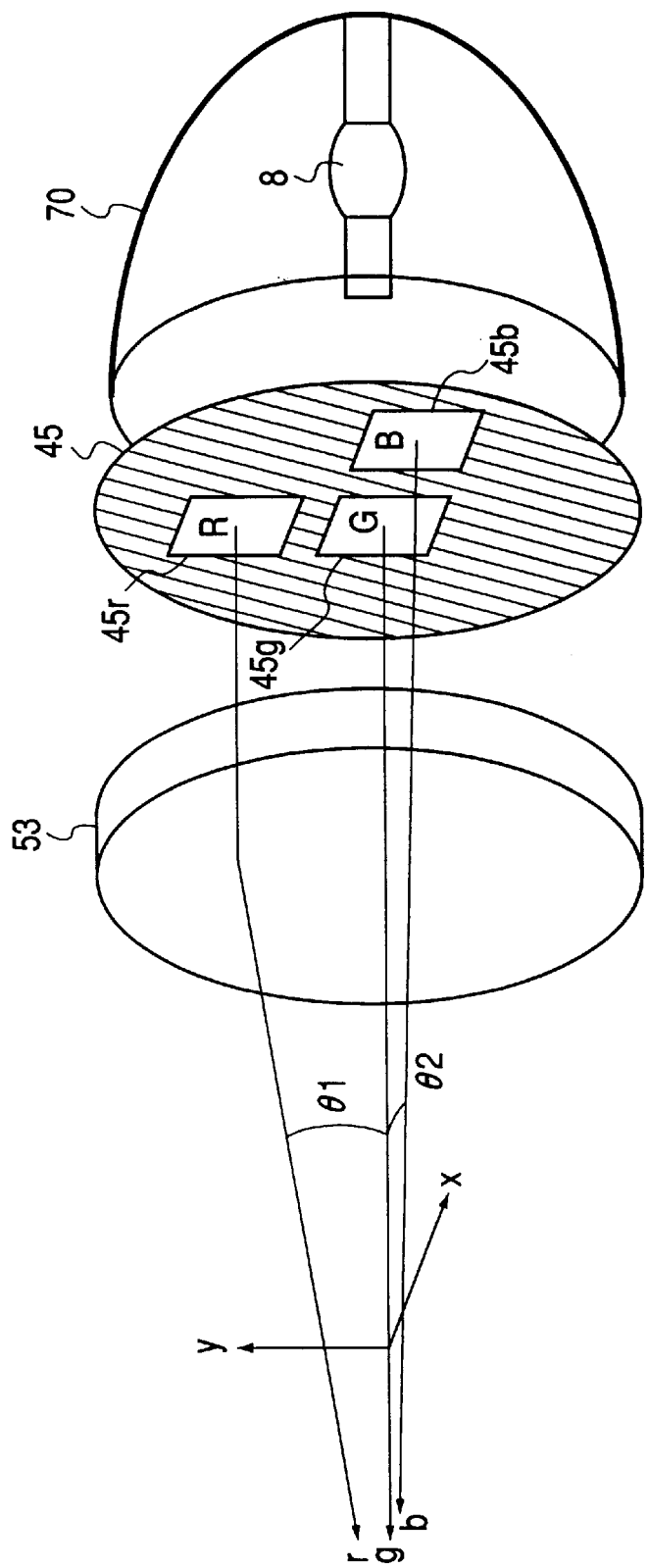
FIG. 22 is a perspective view of an illuminating system in Embodiment 4 of the display apparatus of the present invention.

FIG. 22 is a schematic view of the essential portions of Embodiment 4 of the projection type liquid crystal display apparatus of the present invention. In FIG. 22, the reference numeral 8 designates a lamp emitting a white light beam, the reference numeral 70 denotes a parabolic reflector, the reference numeral 45 designates a light intercepting mask with a color filter having openings comprising R, G and B color filters, and the reference numeral 53 denotes a condensing lens. The G filter opening portion 45g of the light intercepting mask 45 is located at the center of the circular opening of the reflector 70, i.e., on the optical axis of an illuminating system, the R filter opening portion 45r of the mask 45 is located upwardly adjacent thereto (y-direction), and the B filter opening portion 45b of the mask 45 is located rightwardly adjacent thereto (x-direction).

Also, the condensing lens 53 has its power set so as to condense parallel light beams emerging from the openings 45g, 45r and 45b on the liquid crystal panel to be illuminated, as indicated by arrows r, g and b. However, the green light G from the opening 45g passes on the optical axis and therefore rectilinearly passes through the lens 53, while the red light R is bent by an angle θ1 in the y-axis direction by the lens 53, and the blue light B is bent by an angle θ2 in the x-axis direction. Here, θ1 and θ2 are equal to θ described in Embodiment 1.

Accordingly, by the optical axis of the illuminating system being designed to extend perpendicularly through the surface of the liquid crystal panel to be illuminated, the green light G can illuminate the liquid crystal panel at an angle of incidence which is perpendicular thereto, the red light R can illuminate the liquid crystal panel at an angle of incidence inclined by θ1 in the y-axis direction with respect to the perpendicular direction, and the blue light B can illuminate the liquid crystal panel at an angle of incidence inclined by θ2 in the x-axis direction with respect to the perpendicular direction, and it becomes possible to construct a display apparatus using a liquid crystal panel as in Embodiment 1 or Embodiment 3. According to such an illuminating system, desired illumination can be effected by a relatively simple construction.

FIG. 23 is a cross-sectional view of the essential portions of Embodiment 5 of the display panel of the present invention. FIG. 23 shows a fragmentary enlarged cross-sectional view of a display panel 300 using a so-called DMD (deformable mirror device). In FIG. 23, the reference numeral 21 designates a microlens array substrate, the reference numeral 22 denotes microlenses, the reference numeral 23 designates sheet glass, the reference numeral 231 denotes a reflection preventing coat layer, the reference numeral 261 designates pixel electrodes, the reference numeral 271 denotes an active matrix driving circuit portion, and the reference numeral 281 designates a silicon semiconductor substrate.

The microlenses 22 are formed on the surface of the glass substrate 21 formed of alkaline origin glass by the so-called ion exchange method, and form array structure in which they are two-dimensionally arranged at a pitch twice as great as the pitch of the pixel electrodes 261. The pixel electrodes 261 are formed of aluminum and serve also as reflecting mirrors, and perform a flexing operation in conformity with a writing-in signal by the active matrix driving circuit portion 271, as indicated by arrow a in FIG. 23.

The active matrix driving circuit portion 271 is a semiconductor circuit provided on the so-called silicon semiconductor substrate 281, and serves to active-matrix-drive the pixel electrodes 261, and gate line drivers (such as vertical registers) and signal line drivers (such as horizontal registers), not shown, are provided around this circuit matrix (the details will be described later).

These peripheral drivers and the active matrix driving circuit portion 271 are designed to write R, G and B primary color image signals into a plurality of R, G and B color pixels, and the pixel electrodes 261 do not have color filters, but yet are distinguished as R, G and B color pixels by primary color image signals written in by the active matrix driving circuit, and form the same arrangement of R, G and B pixels as that in FIG. 6. Also, the pitch of the microlenses and the pitch and disposition of the pixel electrodes and the distance or the like thereof are entirely similar to those in Embodiment 1.

Accordingly, when a display apparatus is formed with the panel of Embodiment 5 combined with the illuminating system as previously described as in Embodiment 2, the optical paths of R, G and B color lights as exemplarily shown by G1 and R1 in FIG. 23 are assumed, whereby identical pixel color mixed display similar to that in Embodiment 2 becomes possible. Also, as the ray of the green light G2 indicates, the black display of a certain pixel is due to the pixel electrodes 261 being flexed, whereby the reflected light thereof deviates from the openings in the projection lens, the eyepiece, etc.

Splendid color image display of high quality free of the so-called R, G, B mosaic as in the prior art previously described also becomes possible.

FIGS. 24A, 24B and 24C are schematic views showing the construction of Embodiment 6 of the present invention showing a projection type liquid crystal display apparatus using a transmission type liquid crystal panel. FIG. 24A is a top plan view of Embodiment 6, FIG. 24B is a front view thereof, and FIG. 24C is a side view.

In FIGS. 24A to 24C, the reference numeral 1 designates a projection lens, the reference numeral 200 denotes a transmission type liquid crystal panel with a microlens array, the reference numeral 40 designates an R reflecting dichroic mirror reflecting only red light, the reference numeral 41 denotes a B/G reflecting dichroic mirror reflecting only blue and green lights, the reference numeral 42 designates a B reflecting dichroic mirror reflecting only blue light, the reference numeral 43 denotes a high reflection mirror reflecting all color lights, the reference numeral 50 designates a Fresnel lens, the reference numeral 51 denotes a convex lens, the reference numeral 6 designates a rod type integrator, the reference numeral 7 denotes an elliptical reflector, and the reference numeral 8 designates an arc lamp such as a metal halide lamp or a UHP.

Here, the R reflecting dichroic mirror 40, the B/G reflecting dichroic mirror 41 and the B reflecting dichroic mirror 42 have the spectral reflection characteristics as shown in FIGS. 2A to 2C. These dichroic mirrors, with the high reflection mirror 43, are three-dimensionally disposed like those shown in the perspective view of FIG. 3, and are adapted to color-resolve white illuminating light into R, G and B and are designed such that the primary color lights R, G and B illuminate the liquid crystal panel three-dimensionally from different directions.

Describing here in accordance with the travelling process of the light beam, the white light beam from the lamp 8 is first condensed on the light incidence surface 6a of the integrator 6 forward of the elliptical reflector 7 by the elliptical reflector 7, and has its cross-sectional light intensity distribution uniformized as it travels through the integrator 6 while being repetitively reflected by the inner surface thereof. The light beam having emerged from the light emergence surface 6b of the integrator 6 is collimated by the convex lens 51 and the Fresnel lens 50 and is directed in the x-axis-direction (the reference in FIG. 24B), and comes to the B reflecting dichroic mirror 42.

In this B reflecting dichroic mirror 42, only the blue light B is reflected in the z-axis-direction, i.e., downwardly (the reference in FIG. 24B) and travels toward the R reflecting dichroic mirror 40 at a predetermined angle with respect to the z-axis.

On the other hand, the other red and green lights R/G than the blue light B pass through the B reflecting dichroic mirror 42 and are reflected at a right angle in the z-axis-direction (downwardly) by the high reflection mirror 43, and travel toward the R reflecting dichroic mirror 40. Speaking here on the basis of FIG. 24A, both of the B reflecting dichroic mirror 42 and the high reflection mirror 43 are disposed so as to reflect the light beam (the x-axis-direction) from the integrator 6 in the z-axis-direction (downwardly), and the high reflection mirror 43 has been rotated by just 45° from the x- and z-axes in x z plane with its axis parallel to the y-axis as a rotational axis.

Also, the B reflecting dichroic mirror 42 is set as having been rotated by an angle smaller than 45° in x z plane with its axis parallel to the y-axis as a rotational axis. Accordingly, the red and green lights R/G reflected by the high reflection mirror 43 are reflected at a right angle in the z-axis-direction, whereas the blue light B reflected by the B reflecting dichroic mirror 42 travels downwardly in a state inclined at a predetermined angle in x z plane with respect to the z-axis.

In order to make the illumination ranges of the blue light B and the red and green lights R/G on the liquid crystal panel 2 coincident with each other, the amounts of shift and the amounts of tilt of the high reflection mirror 43 and the B reflecting dichroic mirror 42 are selected so that the principal rays of the respective color lights may intersect with one another on the liquid crystal panel 200.

Next, the three primary color lights R, G and B directed downwardly (in the z-axis-direction) travel toward the R reflecting dichroic mirror 40 and the B/G reflecting dichroic mirror 41. These mirrors 40 and 41 are located under the B reflecting dichroic mirror 42 and the high reflection mirror 43, and the B/G reflecting dichroic mirror 41 is inclined by 45° in y z plane with respect to the y- and z-axes with its axis parallel to the x-axis as a rotational axis and the R reflecting dichroic mirror 40 is also set to an angle smaller than 45° in y z plane with its axis parallel to the x-axis as a rotational axis.

Accordingly, of the color lights R, G and B entering these mirrors, the blue and green lights B/G pass through the R reflecting dichroic mirror 40, are reflected at a right angle in the y-axis +direction by the B/G reflecting dichroic mirror 41 and illuminate the liquid crystal panel 2 horizontally disposed in x z plane. The blue light B, as previously described (see FIGS. 24A and 24B), travels at a predetermined angle (tilted in x z plane) with respect to the x-axis and therefore, after the reflection by the B/G reflecting dichroic mirror 41, it maintains a predetermined angle (tilted in x y plane) with respect to the y-axis, and illuminates the liquid crystal panel 200 with that angle as the angle of incidence (the direction of x y plane).

The green light G is reflected at a right angle by the B/G reflecting dichroic mirror 41 and travels in the y-axis +direction, and illuminates the liquid crystal panel 200 at an angle of incidence of 0°, i.e., perpendicularly thereto. Also, the red light R, as previously described, is reflected in the y-axis +direction by the R reflecting dichroic mirror 40 disposed short of the B/G reflecting dichroic mirror 41, but travels in the y-axis +direction at a predetermined angle (tilted in y z plane) with respect to the y-axis, as shown in FIG. 24C (a side view), and illuminates the liquid crystal panel 200 with this angle with respect to the y-axis as the angle of incidence (the direction of y z plane).

Also, in order to make the illumination ranges of the respective color lights R, G and B on the liquid crystal panel 200 coincident with one another as previously described, the amounts of shift and the amounts of tilt of the B/G reflecting dichroic mirror 41 and the R reflecting dichroic mirror 40 are selected so that the principal rays of the respective color lights may intersect with one another on the liquid crystal panel 200. Further, as shown in FIGS. 2A, 2B and 2C, the cut wavelength of the B/G reflecting dichroic mirror 41 is 570 nm and the cut wavelength of the R reflecting dichroic mirror 40 is 600 nm and therefore, unnecessary orange-colored light is transmitted through the B/G reflecting dichroic mirror 41 and discarded. Thereby, optimum color balance can be obtained.

As will be described later, the color lights R, G and B are polarization-modulated by the liquid crystal panel 200 and become image lights, and travel in the y-axis +direction, and are enlargedly projected onto a screen (not shown) through the projection lens 1. Now, the color lights R, G and B illuminating the liquid crystal panel 200 differ in the angle of incidence onto the panel from one another and therefore, the lights R, G and B transmitted therethrough and modulated thereby also differ in the angle of emergence from the panel from one another and thus, a lens having a large lens diameter and aperture sufficient to introduce all of these lights is used as the projection lens 1. However, the expause of the whole light beam incident on the projection lens 4 is the sam as the expause of the whole light beam when it enters the liquid crystal panel 200 because each color light passes twice through the microlens and thereby becomes parallel light.

However, as shown in FIG. 13, in the transmission type according to the prior art, the light beam which has emerged from the liquid crystal panel widens more greatly with the condensing action of the microlenses also added and therefore, a still greater numerical aperture has been required of a projection lens for introducing this light beam thereinto and thus, the projection lens has become expensive. In the present embodiment, however, the expause of the whole light beam from the liquid crystal panel 2 is smaller than in the example of the prior art and therefore, even a projection lens having a smaller numerical aperture can obtain a sufficiently bright projected image on the screen and thus, a more inexpensive projection lens can be used.

Figure 25:
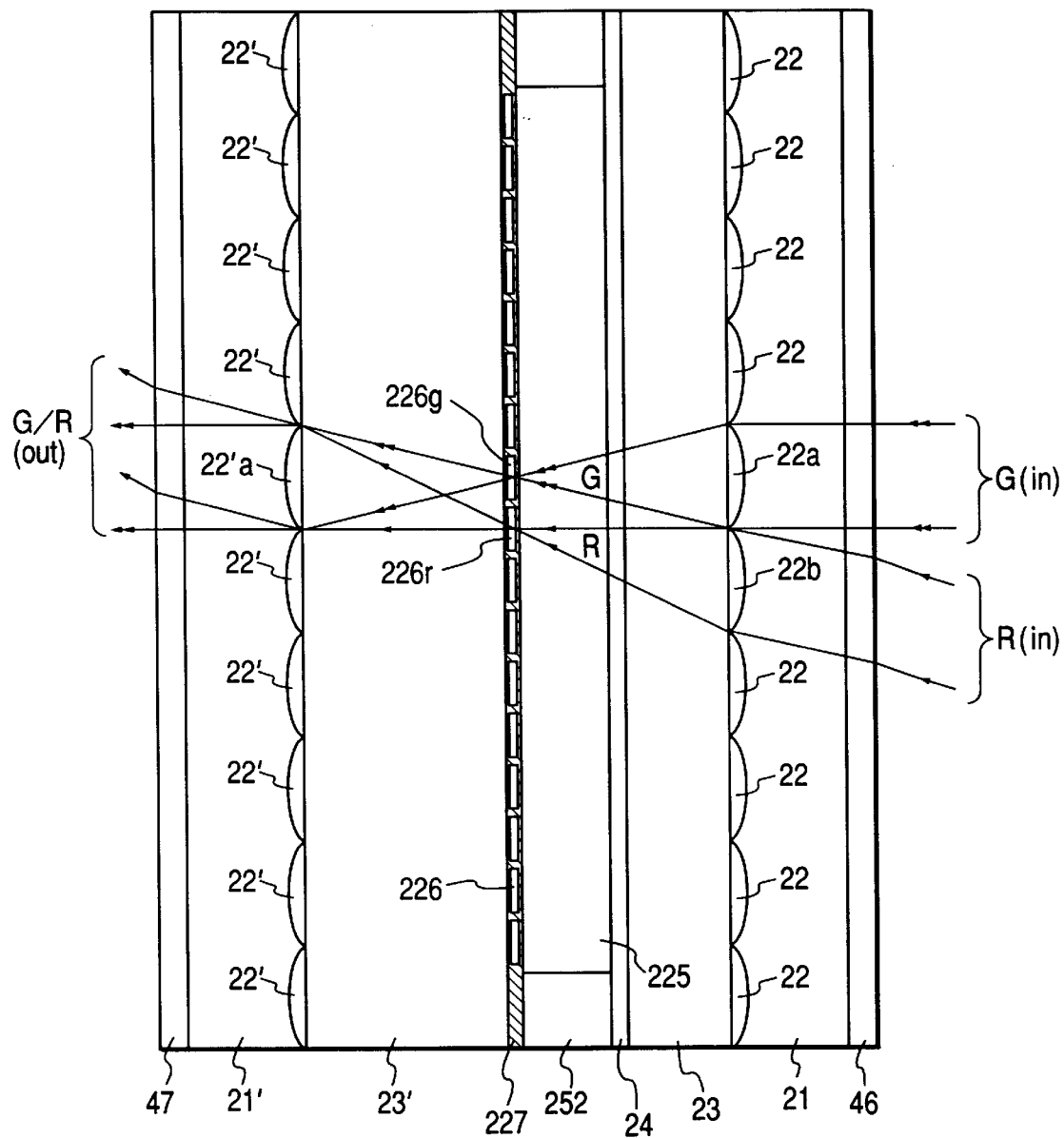
FIG. 25 is a cross-sectional view of the transmission type liquid crystal panel according to Embodiment 6 of the present invention.

Description will now be made of the liquid crystal panel 200 according to the present invention used here. FIG. 25 shows an enlarged typical cross-sectional view (corresponding to the y z plane of FIGS. 24A to 24C) of the liquid crystal panel 200. The reference numerals 21 and 21' designate microlens substrates, the reference numerals 22 and 22' denote microlenses, the reference numerals 23 and 23' designate sheet glass, the reference numeral 24 denotes a transparent opposed electrode, the reference numeral 225 designates a TN liquid crystal layer, the reference numeral 226 denotes transparent pixel electrodes, and the reference numeral 227 designates an active matrix driving circuit portion. The reference numerals 47 and 46 denote a pair of polarizing plates which are in a cross nicol relation.

The microlenses 22 and 22' are formed on the surfaces of the glass substrates 21 and 21' formed of glass of the alkaline origin by the so-called ion exchange method, and form array structure in which they are two-dimensionally arranged at a pitch double the pitch of the pixel electrodes 226. The sheet glass 23 and 23' is adhesively secured onto the microlens arrays on the light incidence and emergence sides. The liquid crystal layer 225 adopts nematic liquid crystal of the so-called TN mode adapted for the transmission type, and in a state in which no electric field is applied thereto, predetermined orientation is maintained by an oriented layer, not shown. The pixel electrodes 226 comprise TTO and are formed on the sheet glass 23.

Figure 29:
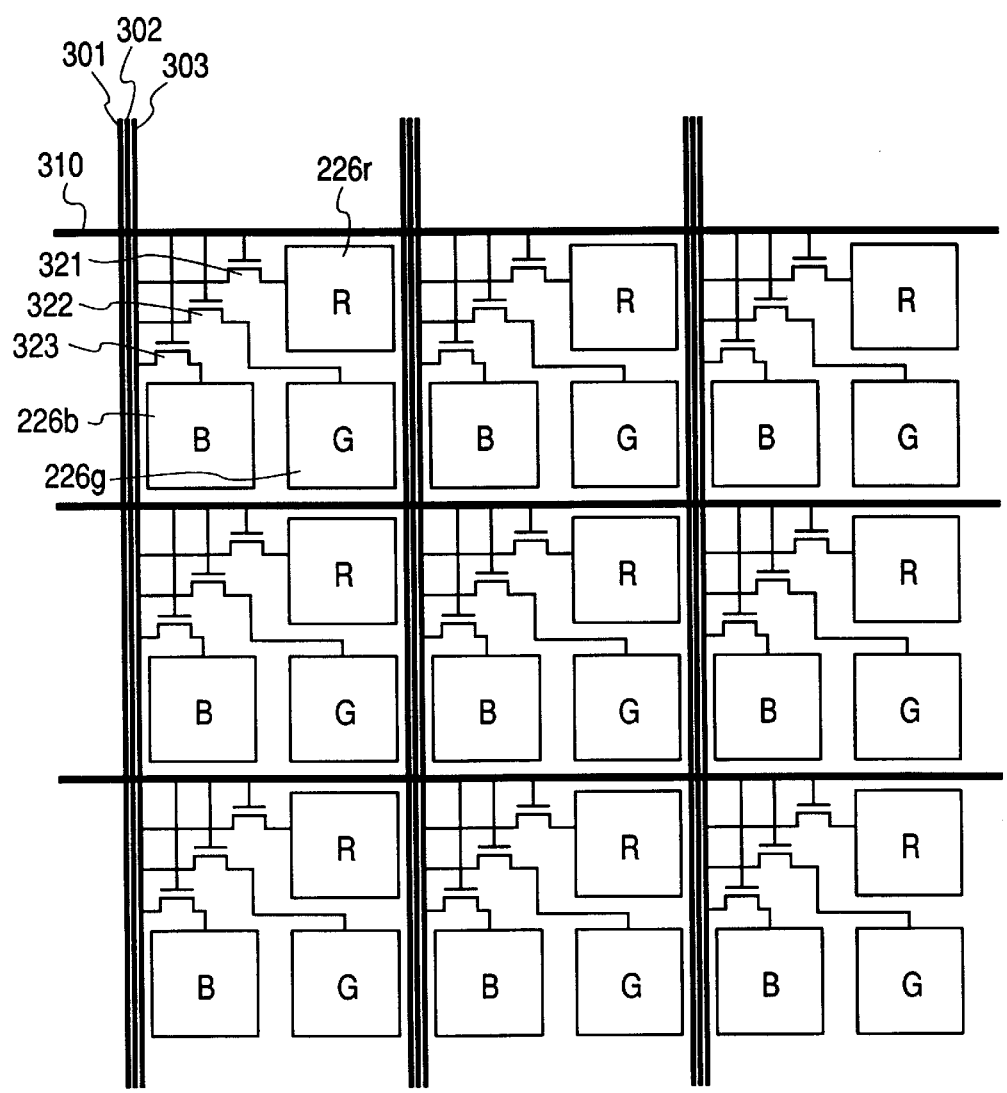
FIG. 29 shows the layout of the TFT portion of the transmission type liquid crystal panel according to Embodiment 6 of the present invention.
Figure 6:
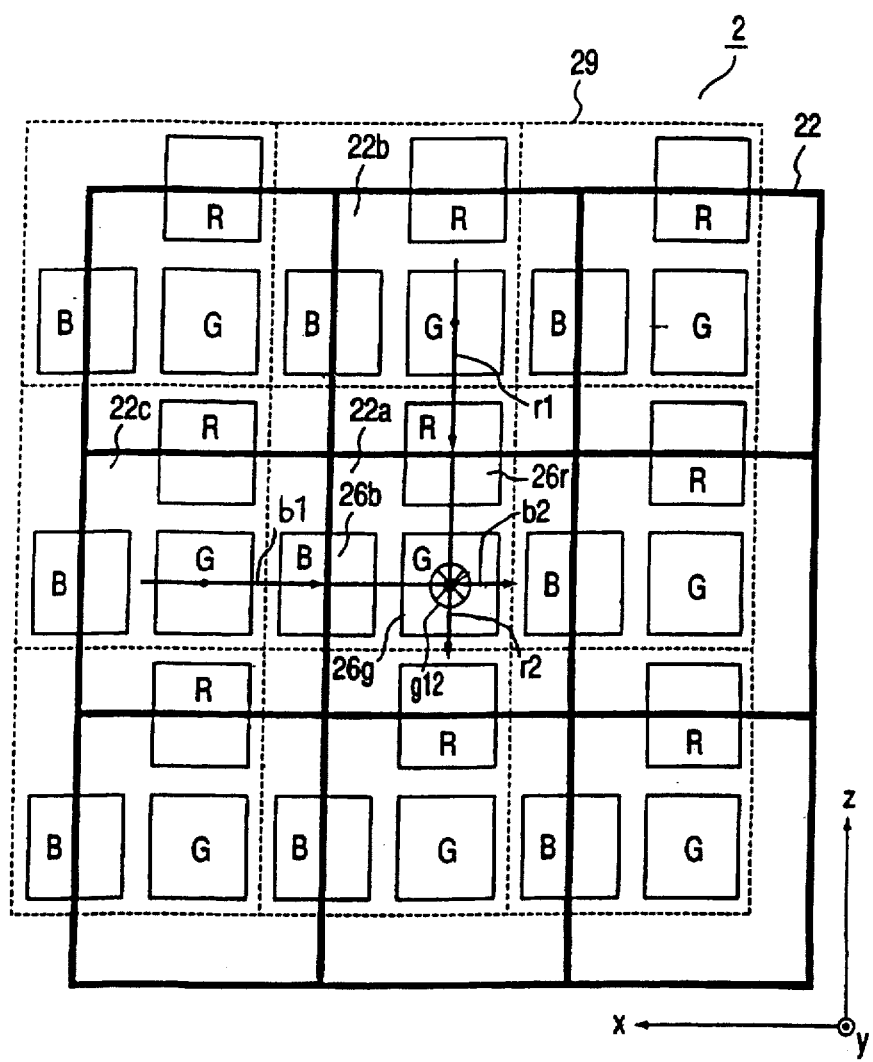

The active matrix driving circuit portion 227 is a so-called TFT circuit having so-called amorphous or polysilicon thin film as a base, and active-matrix-drives the pixel electrodes 226, and is formed on the sheet glass 23' and has such a layout as shown in FIG. 29. The reference numerals 301, 302 and 303 designate B, G and R signal image lines, respectively, the reference numeral 310 denotes a gate line, the reference numerals 321 to 323 designate TFT's, and the reference characters 226r, 226g and 226b denote R, G and B transparent pixel electrodes, respectively.

Also, gate line drivers (such as vertical resisters) and signal line drivers (such as horizontal registers), not shown, are provided in the peripheral portion of the circuit matrix (the details of which will be described later). These peripheral drivers and the active matrix driving circuit are constructed to write R, G and B primary color image signals into predetermined respective R, G and B pixels, and the respective pixel electrodes 226 do not have color filters, but yet are distinguished as R, G and B pixels by the primary color image signals written in by the active matrix driving circuit portion 227, and form a predetermined R, G, B pixel arrangement which will be described later.

The green light G illuminating the liquid crystal panel 200 enters the liquid crystal panel 200 perpendicularly thereto as previously described. Of these rays of light, an example of the light beam entering a microlens 22a is indicated by arrows G (in) in FIG. 25. As shown there, this G light beam is condensed by the microlens and illuminates the G (green) pixel electrode 226g. It then passes through the liquid crystal layer 225, whereafter it emerges out of the liquid crystal panel through the microlens 22'a on the TFT side. When it thus passes through the liquid crystal layer 225, the green light G having had its linearly polarized light taken out by the polarizer 46 is subjected to polarization modulation by the liquid crystal having its oriented state changed by an electric field formed between the pixel electrode 226g and the opposed electrode 24 by a signal voltage applied to the pixel electrode 226g, and emerges from the liquid crystal panel.

Here, the quantity of the polarized light passing through an analyzer 47 and travelling toward the projection lens 1 is varied by the degree of this polarization modulation and thus, so-called gradation harmony display about the pixels is done. On the other hand, as described above, the red light R entering from an oblique direction in a cross-section (y z plane) in the figure also has its linearly polarized light taken out by the polarizer 46. The red light beam R entering the microlens 22b, as indicated by arrows R (in) in FIG. 25, is condensed by the microlens 22b and illuminates the R (red) pixel electrode 226r at a position downwardly shifted from right beneath the microlens 22b. It then passes through this R pixel electrode 226r and as shown, it emerges out of the panel also through the microlens 22'a on the TFT side (G/R (out)).

At this time, the red polarized light beam R is subjected to polarization modulation by the liquid crystal having its oriented state changed by an electric field formed also between the R pixel electrode 226r and the opposed electrode 24 by a signal voltage applied to the R pixel electrode 226r and emerges from the liquid crystal panel. Thereafter, just as in the case of the aforedescribed green light G, the red light R becomes image light which effects the gradation harmony display of the R pixel.

Now, in FIG. 25, the color lights G and R on the G pixel electrode 226g and the R pixel electrode 226r, respectively, are depicted as partly overlapping each other and interfering with each other, but this is because they are depicted with the thickness of the liquid crystal layer typically exaggerated, and actually the thickness of the liquid crystal layer is of the order of $5\mu$ at greatest, and this thickness is very small as compared with the thickness 50 to $100\mu$ of the sheet glass, and independently of the pixel size, such interference does not occur.

Figure 26A:
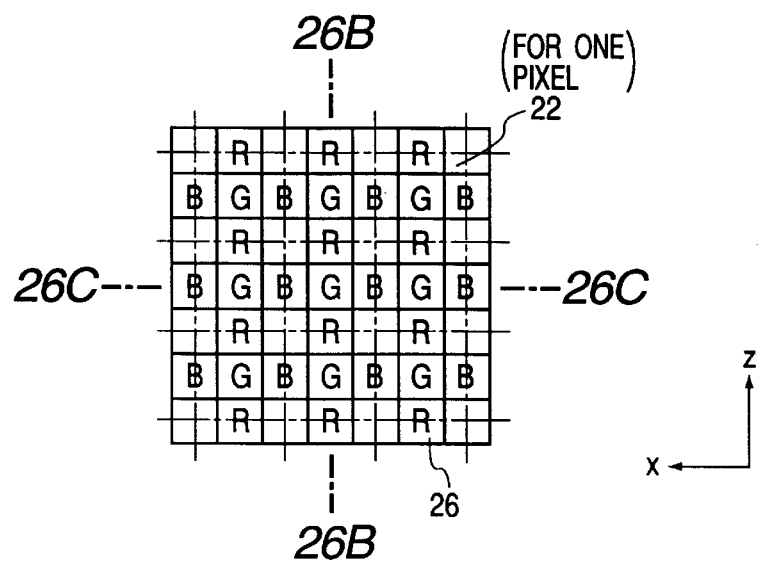
FIGS. 26A, 26B and 26C illustrate the principle of color resolution and color combination in the transmission type liquid crystal panel according to Embodiment 6 of the present invention.
Figure 26B:
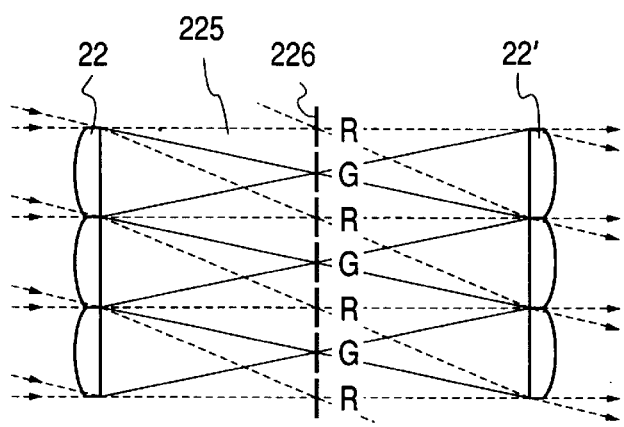
Figure 26C:
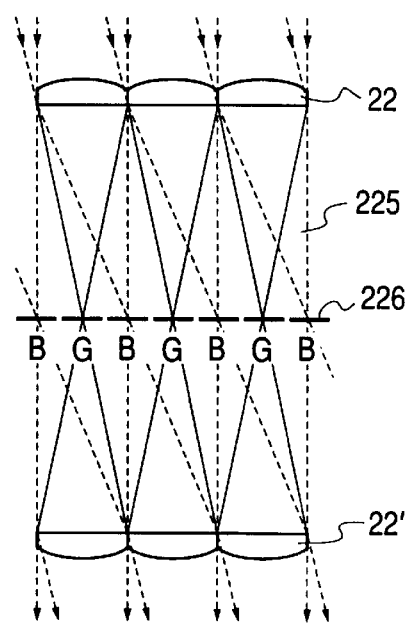

FIGS. 26A, 26B and 26C show the principle of color resolution and color combination in the present embodiment. FIG. 26A is a typical top plan view of the liquid crystal panel 200, and FIGS. 26B and 26C are typical cross-sectional views along the line 26C—26C (x direction) and the line 26B—26B (z direction), respectively, in FIG. 26A.

FIG. 26C corresponds to FIG. 25 showing y z cross-section, and represents the manners of incidence and emergence of the green light G and the red light R entering the microlenses 22. As can be seen from this, each G (green) pixel electrode is disposed right beneath the center of each microlens, and each R (red) pixel electrode is disposed right beneath the boundary between the microlenses 22.

Accordingly, it is preferable to set the angle of incidence θ of the red light R onto the R pixel electrode so that the tane thereof may become equal to the ratio between the pixel pitch of the alternately arranged G and R pixels and the distance between the microlens and the pixel electrode. On the other hand, FIG. 26B corresponds to the x y cross-section of the liquid crystal panel 200. With regard to this x y cross-section, the B (blue) pixel electrodes and the G (green) pixel electrodes are alternately disposed as in FIG. 26C, and each G pixel electrode is disposed right beneath the center of each microlens 22, and each B pixel electrode is disposed right beneath the boundary between the microlenses 22.

Now, the blue light B illuminating the liquid crystal panel 200, as previously described, enters from an oblique direction with respect to the cross-section (x y plane) in the figure and therefore, just as in the case of the red light R, the blue light B having emerged from each microlens 22 passes through the B (blue) pixel electrode, as shown, and emerges from the microlens (22') adjacent in x direction to the microlens (22') at a position right beneath the microlens 22 which the blue light has entered.

The modulation by the liquid crystal on the B pixel electrode and the projection of the blue light beam B from the liquid crystal panel are similar to those of the aforedescribed green light G and red light R. Also, each B pixel electrode is disposed right beneath the boundary between the microlenses 22, and it is preferable that the angle of incidence θ of the blue light B onto the liquid crystal panel be also set so that the tanθ thereof, as in the case of the red light R, may become equal to the ratio between the pixel pitch of the alternately arranged G and B pixels and the distance in y-direction between the microlens and the pixel electrode.

In the liquid crystal panel described above, the arrangement of R, G and B color pixels is RGRGRG . . . with respect to z-direction, and BGBGBG . . . with respect to x-direction. FIG. 26A shows the planar arrangement thereof.

As shown in FIG. 26A, the size of each pixel is about a half of that of each microlens in both length and breadth, i.e., in both x- and z-directions, and the pitch of the pixels also is a half of that of the microlenses. Also, each G pixel, also in plane, is located right beneath the center of each microlens 22, each R pixel is located at the boundary between the G pixels in z-direction and between the microlenses arranged in z-direction, and each B pixel is located at the boundary between the G pixels in x-direction and between the microlenses arranged in x-direction. Also, the shape of a microlens unit is a square (the size of a side of which is double the size of a side of the pixel).

Figure 27:
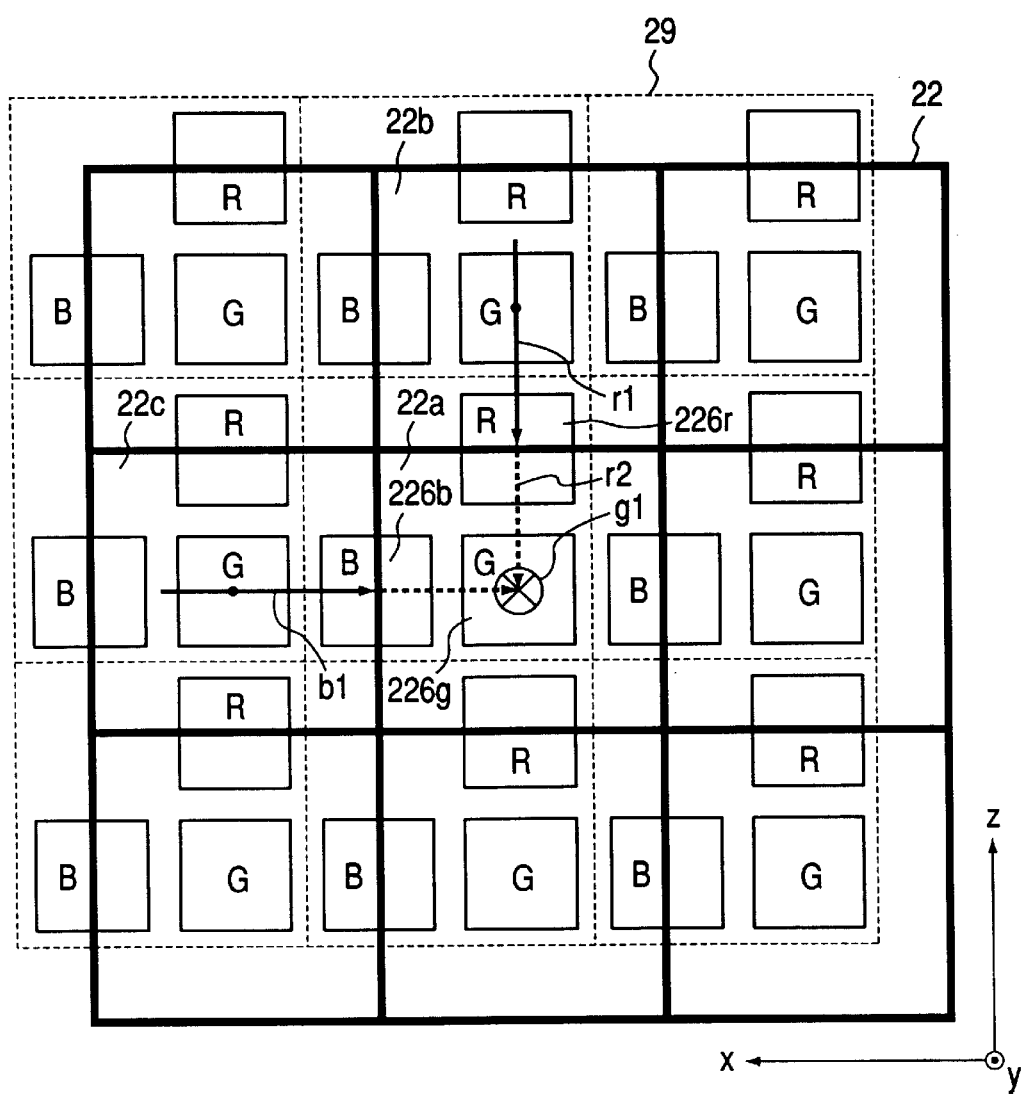
FIG. 27 is a fragmentary enlarged top plan view of the transmission type liquid crystal panel according to Embodiment 6 of the present invention.

FIG. 27 is a fragmentary enlarged top plan view of the liquid crystal panel 200 according to the present embodiment. In FIG. 27, a broken line lattice 29 indicates an aggregate of three R, G and B color pixels constituting a picture element. That is, when the R, G and B pixels are driven by the active matrix driving circuit portion 227 of FIG. 25, the three R, G and B color pixels indicated by the broken line lattice 29 are driven by R, G and B image signals corresponding to the same picture element position.

Here, paying attention to a picture element comprising an R pixel electrode 226r, a G pixel electrode 226g and a B pixel electrode 226b, the R pixel electrode 262r is illuminated by the red light R emerging from the microlens 22b and obliquely entering it, as indicated by arrow r1, and the passing red light R thereof emerges through a microlens 22'a (not shown) right beneath the microlens 22a, as indicated by broken line arrow r2. The B pixel electrode 226b is illuminated by the blue light B emerging from the microlens 22c and obliquely entering it, as indicated by arrow b1, and the passing blue light B thereof also emerges through the microlens 22'a (not shown light beneath the microlens 22a, as indicated by broken line arrow b2. Also, the G pixel electrode 226g is illuminated by the green light G entering perpendicularly (in a direction toward the back of the plane of the drawing sheet) from the microlens 22a, as indicated by arrow g1 toward the front and rear, and the transmitted light G thereof also emerges perpendicularly in a direction toward the back of the plane of the drawing sheet through the microlens 22'a (not shown) right beneath the microlens 22a.

Thus, in the liquid crystal panel according to the present embodiment, with regard to the R, G and B color pixels constituting a picture element, the positions of incidence of the three primary color illuminating lights onto the surface of the microlens array differ from one another, but the emergence of those lights is effected from a common microlens (in this case, the microlens 22'a). This also holds true of all the other picture elements (R, G, B pixel unit).

Figure 28:
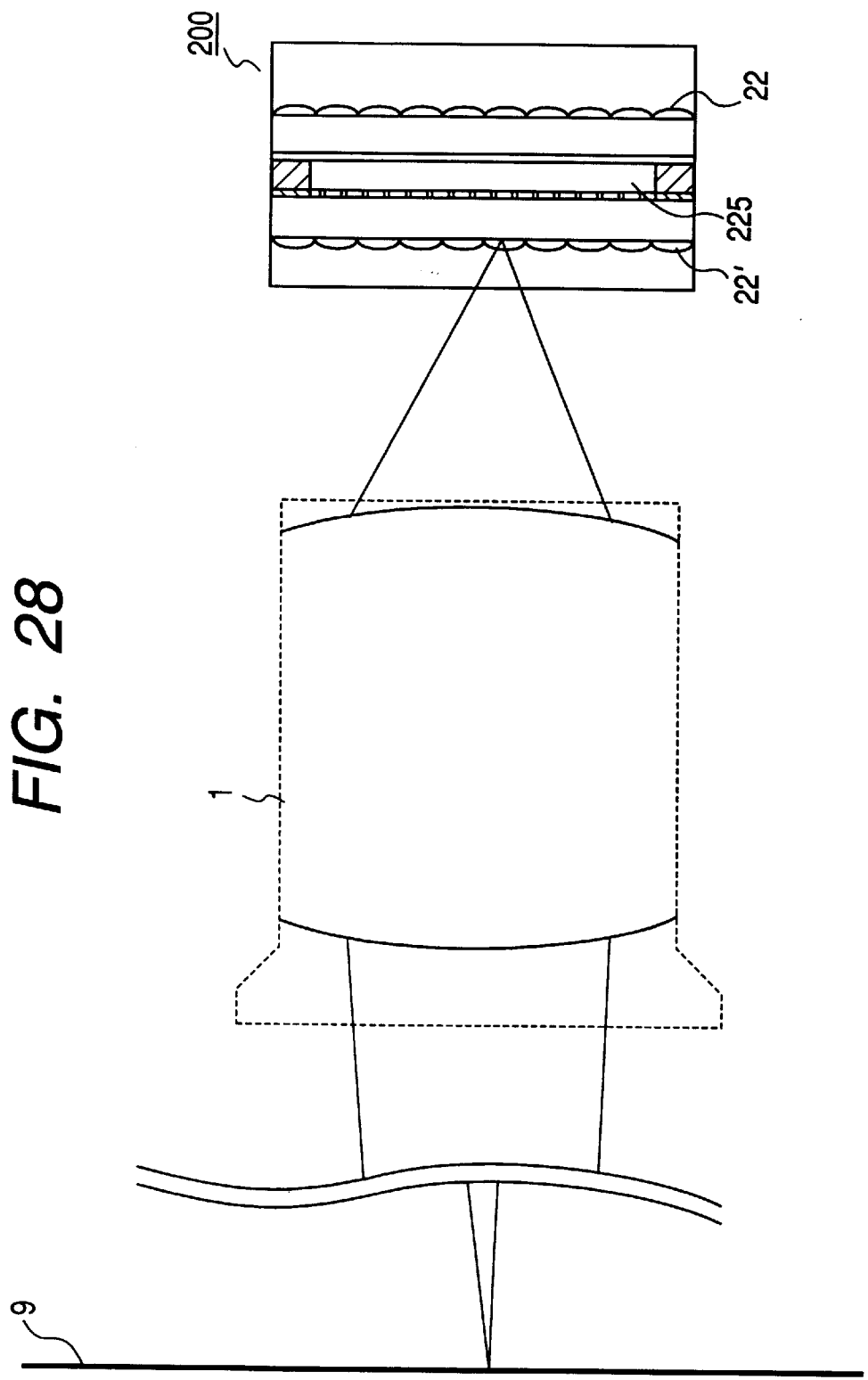
FIG. 28 is a fragmentary construction view showing the projection optical system of a projection type display apparatus using the transmission type liquid crystal panel according to Embodiment 6 of the present invention.

Accordingly, if the microlens array of the liquid crystal panel 200 is adjusted so as to be imaged on the screen 9 when as shown in FIG. 28, all the emergent lights from the liquid crystal panel 200 are projected onto the screen 9 or a wall through the projection lens 1, the projected image becomes one as shown in FIG. 9 wherein a picture element in a state in which the emergent lights from the R, G, B pixel unit constituting a picture element are color-mixed, that is, the same pixels are color-mixed, is constructed in the lattice of microlenses. As in the aforedescribed plurality of embodiments, good color image display of high quality free of the so-called R, G, B mosaic becomes possible.

What is claimed is:

1. A reflection type liquid crystal panel comprising:
   a plurality of pixel units two-dimensionally arranged, each pixel unit including three color pixels corresponding to three different colors; and
   a lens array having a plurality of lenses two-dimensionally arranged, the arrangement pitch of the plurality of lenses being the same as the arrangement pitch of the plurality of pixel units,
   wherein one of the three color pixels is positioned at the optical axis of each lens, the other two color pixels being adjacent to said one color pixel in different directions,
   wherein lights of the three different colors are respectively condensed on the corresponding three color pixels of said pixel unit by different lenses of said lens array, and reflected from the corresponding three color pixels of said pixel unit;
   wherein the lights of the three different colors reflected from the corresponding three color pixels of said pixel unit are caused to be incident in common on one of the plurality of lenses of said lens array.

2. A reflection type liquid crystal panel according to claim 1, wherein each of said two color pixels adjacent to said one color pixel in different directions is disposed at a position corresponding to the boundary of the lenses in said lens array.

3. A reflection type liquid crystal panel according to claim 1, wherein said three color pixels comprise reflection electrodes.

4. A reflection type liquid crystal panel according to claim 3, wherein said three color pixels are adapted to use the DMD operation of the reflection electrodes.

5. A projection type display apparatus comprising:
   a reflection type liquid crystal panel having
      a plurality of pixel units two-dimensionally arranged, each pixel unit including three color pixels corresponding to three different colors; and
      a lens array having a plurality of lenses two-dimensionally arranged, the arrangement pitch of the plurality of lenses being the same as the arrangement pitch of the plurality of pixel units, wherein a first of the three color pixels is positioned at the optical axis of each lens, a second and third of the three color pixels being adjacent to said first color pixel in different directions which are first and second directions, respectively, wherein lights of the three different colors are respectively condensed on the corresponding three color pixels of said pixel unit by different lenses of said lens array, and reflected from the corresponding three color pixels of said pixel unit, wherein the lights of the three different colors reflected from the corresponding three color pixels of said pixel unit are caused to be incident in common on one of the plurality of lenses of said lens array;

an illuminating means for causing a first color light to enter said liquid crystal panel perpendicularly thereto, causing a second color light to obliquely enter said liquid crystal panel within a first plane on which said first direction exists, and causing a third color light to obliquely enter said liquid crystal panel within a second plane on which said second direction exists; and a projecting means for projecting said first, second and third color lights modulated by said liquid crystal panel onto a surface.

6. A projection type apparatus according to claim 5, characterized in that said illuminating means color-resolves white light from a light source into a plurality of color lights by the use of a plurality of dichroic mirrors so that by the disposition of said plurality of dichroic mirrors, said plurality of color lights may be applied to said three color pixels from different directions for the respective color lights.

7. A projection type display apparatus according to claim 5, characterized in that said projecting means projects the disposition surface of said microlenses or the vicinity thereof onto a surface.

8. A direct-view type display apparatus comprising:
a reflection type liquid crystal panel having
  a plurality of pixel units two-dimensionally arranged, each pixel unit including three color pixels corresponding to three different colors; and
  a lens array having a plurality of lenses two-dimensionally arranged, the arrangement pitch of the plurality of lenses being the same as the arrangement pitch of the plurality of pixel units, wherein a first of the three color pixels is positioned at the optical axis of each lens, a second and third of the three color pixels being adjacent to said first color pixel in different directions which are first and second directions, respectively,
wherein lights of the three different colors are respectively condensed on the corresponding three color pixels of said pixel unit by different lenses of said single lens array, and reflected from the corresponding three color pixels of said pixel unit,
wherein the lights of the three different colors reflected from the corresponding three color pixels of said pixel unit are caused to be incident in common on one of the plurality of lenses of said lens array;
an illuminating means for causing a first color light to enter said liquid crystal panel perpendicularly thereto, causing a second color light to obliquely enter said liquid crystal panel within a first plane on which said first direction exists, and causing a third color light to obliquely enter said liquid crystal panel within a second plane on which said second direction exists; and an eyepiece for directing said first, second, and third color lights modulated by said liquid crystal panel to an observer's eyeball.

9. A display apparatus comprising:
a reflection type liquid crystal panel having
  a plurality of pixel units two-dimensionally arranged, each pixel unit including three color pixels corresponding to three different colors; and
  a lens array having a plurality of lenses two-dimensionally arranged, the arrangement pitch of the plurality of lenses being the same as the arrangement pitch of the plurality of pixel units, wherein a first of the three color pixels is positioned at the optical axis of each lens, a second and third of the three color pixels being adjacent to said first color pixel in different directions which are first and second directions, respectively,
wherein lights of the three different colors are respectively condensed on the corresponding three color pixels of said pixel unit by different lenses of said lens array, and reflected from the corresponding three color pixels of said pixel unit,
wherein the lights of the three different colors reflected from the corresponding three color pixels of said pixel unit are caused to be incident in common on one of the plurality of lenses of said lens array; and
an illuminating means for causing a first color light to enter said liquid crystal panel perpendicularly thereto, causing a second color light to obliquely enter said liquid crystal panel within a first plane on which said first direction exists, and causing a third color light to obliquely enter said liquid crystal panel within a second plane on which said second direction exists.

10. A reflection type liquid crystal panel comprising:
a plurality of pixel units two-dimensionally arranged, each pixel unit including three color pixels corresponding to three different colors, said three color pixels being two-dimensionally arranged; and
a lens array having a plurality of lenses which are two-dimensionally arranged, the arrangement pitch of said plurality of lenses being the same as the arrangement pitch of said plurality of pixel units.

11. A transmission type liquid crystal panel comprising:
a plurality of pixel units two-dimensionally arranged, each pixel unit including three color pixels corresponding to three different colors, said three color pixels being two-dimensionally arranged; and
a pair of lens arrays, each lens array having a plurality of lenses which are two-dimensionally arranged, the arrangement pitch of said plurality of lenses being the same as the arrangement pitch of said plurality of pixel units, said plurality of pixel units being provided between said pair of lens arrays.

12. A transmission type liquid crystal panel comprising:
a plurality of pixel units two-dimensionally arranged, each pixel unit including three color pixels corresponding to three different colors; and
a pair of lens arrays, each lens array having a plurality of lenses two-dimensionally arranged, the arrangement pitch of said lenses being the same as the arrangement pitch of the plurality of pixel units,
wherein one of the three color pixels is positioned at the optical axis of each lens, the other two color pixels being adjacent to said one color pixel in different directions, wherein lights of the three different colors are respectively condensed on the corresponding three color pixels of said pixel unit by different lenses of one of said pair of lens arrays, and transmitted through said three color pixels of said pixel unit, wherein the lights of the three different colors transmitted through said three color pixels of said pixel unit are caused to be incident in common on one of the lenses of another of said pair of lens arrays.

13. A projection type display apparatus comprising:

a transmission type liquid crystal panel having
- a plurality of pixel units two-dimensionally arranged, each pixel unit including three color pixels corresponding to three different colors; and
- a pair of lens arrays, each lens array having a plurality of lenses two-dimensionally arranged, the arrangement pitch of said lenses being the same as the arrangement pitch of the plurality of pixel units, wherein a first of the three color pixels is positioned at the optical axis of each lens, a second and third of the three color pixels being adjacent to said first color pixel in different directions which are of first and second directions, respectively, wherein lights of the three different colors are respectively condensed on the corresponding three color pixels of said pixel unit by different lenses of one of said pair of lens arrays, and transmitted through said three color pixels of said pixel unit, wherein the lights of the three different colors transmitted through said three color pixels of said pixel unit are caused to be incident in common on one of the lenses of another of said pair of lens arrays;

an illuminating means for causing a first color light to enter said liquid crystal panel perpendicularly thereto, causing a second color light to obliquely enter said liquid crystal panel within a first plane on which said first direction exists, and causing a third color light to obliquely enter said liquid crystal panel within a second plane on which said second direction exists; and a projecting means for projecting said first, second and third color lights modulated by said liquid crystal panel onto a surface.

14. A direct-view type display apparatus comprising:

a transmission type liquid crystal panel having
- a plurality of pixel units two-dimensionally arranged, each pixel unit including three color pixels corresponding to three different colors; and
- a pair of lens arrays, each lens array having a plurality of lenses two-dimensionally arranged, the arrangement pitch of said lenses being the same as the arrangement pitch of the plurality of pixel units, wherein a first of the three color pixels is positioned at the optical axis of each lens, a second and third of the three color pixels being adjacent to said first color pixel in different directions which are first and second directions, respectively, wherein lights of the three different colors are respectively condensed on the corresponding three color pixels of said pixel unit by three different lenses of one of said pair of lens arrays, and transmitted through said three color pixels of said pixel unit, wherein the lights of the three different colors transmitted through said three color pixels of said pixel unit are caused to be incident in common on one of the lenses of another of said pair of lens arrays; and an illuminating means for causing a first color light to enter said liquid crystal panel perpendicularly thereto, causing a second color light to obliquely enter said liquid crystal panel within a first plane on which said first direction exists, and causing a third color light to obliquely enter said liquid crystal panel within a second plane on which said second direction exists; and an eyepiece for directing said first, second and third color lights modulated by said liquid crystal panel to an observer's eyeball.

15. A display apparatus comprising:

a transmission type liquid crystal panel having
- a plurality of pixel units two-dimensionally arranged, each pixel unit including three color pixels corresponding to three different colors; and
- a pair of lens arrays, each lens array having a plurality of lenses two-dimensionally arranged, the arrangement pitch of said lenses being the same as the arrangement pitch of the plurality of pixel units, wherein a first of the three color pixels is positioned at the optical axis of each lens, a second and third of the three color pixels being adjacent to said first color pixel in different directions which are first and second directions, respectively, wherein lights of the three different colors are respectively condensed on the corresponding three color pixels of said pixel unit by different lenses of one of said pair of lens arrays, and transmitted through said three color pixels of said pixel unit, wherein the lights of the three different colors transmitted through said three color pixels of said pixel unit are caused to be incident in common on one of the lenses of another of said pair of lens arrays; and an illuminating means for causing a first color light to enter said liquid crystal panel perpendicularly thereto, causing a second color light to obliquely enter said liquid crystal panel within a first plane on which said first direction exists, and causing a third color light to obliquely enter said liquid crystal panel within a second plane on which said second direction exists.

* * * * *

UNITED STATES PATENT AND TRADEMARK OFFICE
CERTIFICATE OF CORRECTION

PATENT NO. : 6,281,867 B2
DATED : August 28, 2001
INVENTOR(S) : Kurematsu et al.

It is certified that error appears in the above-identified patent and that said Letters Patent is hereby corrected as shown below:

Column 22,
Line 64, delete "sam" and insert therefor -- same --

Column 24,
Line 63, delete "tane" and insert therefor -- tanθ --

Drawings,
Replace FIG. 6, with the attached formal drawing of FIG. 6, which corrects the reference lines associated with reference numerals b1, b2 and r2.

Signed and Sealed this

Fourteenth Day of May, 2002

Attest:

JAMES E. ROGAN
Attesting Officer        Director of the United States Patent and Trademark Office